United States Patent
Sotzing

(10) Patent No.: US 12,491,199 B2
(45) Date of Patent: Dec. 9, 2025

(54) POLYCANNABINOIDS, COMPOUNDS, COMPOSITIONS AND METHODS OF USE

(71) Applicant: University of Connecticut, Farmington, CT (US)

(72) Inventor: Gregory Allen Sotzing, Storrs, CT (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 242 days.

(21) Appl. No.: 17/232,432

(22) Filed: Apr. 16, 2021

(65) Prior Publication Data

US 2021/0322365 A1     Oct. 21, 2021

Related U.S. Application Data

(60) Provisional application No. 63/011,664, filed on Apr. 17, 2020.

(51) Int. Cl.
| | |
|---|---|
| *A61K 31/352* | (2006.01) |
| *A61K 9/16* | (2006.01) |
| *A61K 9/70* | (2006.01) |
| *A61K 31/00* | (2006.01) |
| *A61K 31/05* | (2006.01) |
| *A61K 47/32* | (2006.01) |
| *A61L 29/06* | (2006.01) |
| *A61L 29/08* | (2006.01) |
| *A61L 29/16* | (2006.01) |
| *A61L 31/06* | (2006.01) |
| *A61L 31/16* | (2006.01) |
| *C08F 32/00* | (2006.01) |
| *C08F 36/20* | (2006.01) |
| *C08F 36/22* | (2006.01) |

(52) U.S. Cl.
CPC .......... *A61K 31/658* (2023.05); *A61K 9/1635* (2013.01); *A61K 9/7007* (2013.01); *A61K 9/7023* (2013.01); *A61K 47/32* (2013.01); *A61L 29/06* (2013.01); *A61L 29/085* (2013.01); *A61L 29/16* (2013.01); *A61L 31/06* (2013.01); *A61L 31/16* (2013.01); *C08F 32/00* (2013.01); *C08F 36/20* (2013.01); *C08F 36/22* (2013.01); *A61L 2300/216* (2013.01)

(58) Field of Classification Search
None
See application file for complete search history.

(56) References Cited

U.S. PATENT DOCUMENTS

| | | | |
|---|---|---|---|
| 5,023,252 A | 6/1991 | Hseih | |
| 8,741,317 B2 | 6/2014 | Uhrich et al. | |
| 2005/0074408 A1 | 4/2005 | Makriyannis et al. | |
| 2006/0160985 A1* | 7/2006 | Pacetti | C09D 167/00 |
| | | | 528/272 |
| 2008/0014170 A1* | 1/2008 | Hnojewyj | A61L 31/14 |
| | | | 424/78.37 |
| 2009/0036523 A1 | 2/2009 | Stinchcomb et al. | |
| 2010/0184635 A1* | 7/2010 | Tollington | C08G 18/664 |
| | | | 512/26 |
| 2012/0142581 A1* | 6/2012 | Taft | A61P 25/18 |
| | | | 514/567 |
| 2014/0018435 A1 | 1/2014 | Hong et al. | |
| 2014/0329895 A1 | 11/2014 | Riggs-Sauthier et al. | |
| 2015/0159082 A1 | 6/2015 | Lee et al. | |
| 2015/0344618 A1* | 12/2015 | Nicholson | C08G 63/78 |
| | | | 424/94.1 |
| 2017/0172977 A1 | 6/2017 | Kleidon et al. | |
| 2017/0189348 A1 | 7/2017 | Lee et al. | |
| 2018/0271827 A1 | 9/2018 | Heimark et al. | |
| 2018/0272043 A1 | 9/2018 | Taylor et al. | |
| 2021/0052494 A1* | 2/2021 | Flemmens | A61K 47/34 |
| 2024/0336833 A1 | 10/2024 | Sotzing | |
| 2025/0043215 A1 | 2/2025 | Sotzing | |
| 2025/0090556 A1 | 3/2025 | Sotzing et al. | |
| 2025/0122395 A1 | 4/2025 | Sotzing et al. | |

FOREIGN PATENT DOCUMENTS

GB        621102 A   *   4/1949

OTHER PUBLICATIONS

Harris, European Polymer Journal, 120, 2019 (Year: 2019).*
U.S. Appl. No. 62/891,179 provisional application for U.S. Appl. No. 17/001,250 (Year: 2021).*
Malone, BJP, 162, 2011 (Year: 2011).*
Borrelli, Biochemical Pharmacology, 85, 2013 (Year: 2013).*
DeLong, Drug Alcohol Depend, 112, 1-2, 2010 (Year: 2010).*
International Search Report and Written Opinion issued in International Application No. PCT/US21/27586; International Filing Date Apr. 16, 2021; Date of Mailing Jul. 14, 2021; 8 pages.
Morales, Paula et al.; "An Overview on Medicinal Chemistry of Synthetic and Natural Derivatives of Cannabidiol"; Frontiers in Pharmacology, V. 8, Article 422, Jun. 2017, p. 1-18.
Robert Daniels et al., "Poly(cannabinoid)s: Hemp-Derived Biocompatible Thermoplastic Polyesters with Inherent Antioxidant Properties", ACS Applied Materials & Interfaces, Nov. 21, 2022; 8 pages.
Wang et al. "Poly(Glycerol Sebacate) in Tissue Engineering and Regenerative Medicine", Material Matters, 2016, 11.3; 13 pages.
Extended European Search Report Issued Mar. 19, 2024; 8 pages.
Bowd et al. Photochemical Transformations of Cannabinol J.C.S. Chem Comm (1975) 797-798.

(Continued)

*Primary Examiner* — Robert A Wax
*Assistant Examiner* — William Craigo
(74) *Attorney, Agent, or Firm* — CANTOR COLBURN LLP

(57) ABSTRACT

Polymers comprising a plurality of cannabinoids, methods of preparation thereof, and methods of use to treat a number of disease conditions are reported. Also provided are polymer coatings, films, fibers, and non-woven fabrics for a variety of topical applications including stents, bandages, sutures, and transdermal patches.

26 Claims, 5 Drawing Sheets

(56) References Cited

OTHER PUBLICATIONS

Martin-Fontecha et al. A Fluorescent Probe to Unravel Functional Features of Cannabinoid Receptor CB1 in Human Blood and Tonsil Immune System Cells Bioconjugate Chem. (2018), 29, 2, 382-389.
Pubchem et al., Substance Record for SID 440246656. Modify Date: Feb. 21, 2021 [retrieved on Sep. 18, 2024] Retrieved from the Internet: <URL; https://pubchem.ncbi.nlm.nih.gov/sustance/440246656>.entire document, Substance Record for SID 440246656. Modify Date: Feb. 21, 2021 [retrieved on Sep. 18, 2024] Retrieved from the Internet: <URL; https://pubchem.ncbi.nlm.nih.gov/sustance/440246656>.entire document.
Sarott et al. Development of High-Specificity Fluorescent Probes to Enable Cannabinoid Type 2 Receptor Studies in Living Cells, J. Am. Chem. Soc. (2020) 142, 40, 16953-16964.
U.S. Appl. No. 19/183,058, filed Apr. 18, 2025; Inventors Gregory A. Sotzing, Pragati Rout, Lakshmi S. Nair, and Erick Orozco; Applicant University of Connecticut; Title Coadministration of Polycannabinoid With Amine/Amide Anesthetics to Enhance Efficacy Against Pain.
Weiner et al. "Monomers and polymers of delta1(6)-tetrahydrocannabinol and cannabidiol" European Journal of Medicinal Chemistry vol. 10, No. 1, 79-83, 1975.

* cited by examiner

POLYCANNABINOIDS, COMPOUNDS, COMPOSITIONS AND METHODS OF USE

CROSS-REFERENCE TO RELATED APPLICATIONS

This application claims priority to U.S. Provisional Application No. 63/011,664, filed Apr. 17, 2020, which is incorporated by reference in its entirety for all purposes.

FIELD

Provided are polymers comprising a plurality of cannabinoids, methods of preparation thereof, and methods of use to treat a number of disease conditions. Also provided are polymer coatings, films, fibers, and non-woven fabrics for a variety of topical applications including stents, bandages, sutures, and transdermal patches.

BACKGROUND

Cannabinoids are compounds derived from the *Cannabis sativa* plant or hemp. There are currently over 100 different cannabinoid compounds isolated from the plant as well as other chemical synthetic cannabinoids, or cannabimimetics, which have been developed as alternatives to the plant derived compounds.

Cannabinoids have been reported for their ability to bind to cannabinoid receptors located throughout the body giving rise to these natural products to remediate a number of medical conditions. Recently, cannabinoids have been found useful for the treatment a wide range of medical conditions, including glaucoma, AIDS wasting, neuropathic pain, treatment of spasticity associated with multiple sclerosis, fibromyalgia and chemotherapy-induced nausea. Cannabinoids have also been reported to exhibit a therapeutic effect in the treatment of allergies, inflammation, infection, epilepsy, depression, migraine, bipolar disorders, anxiety disorder, and drug dependency and withdrawal syndromes. Cannabinoids have also been reported for their ability to remediate chronic pain, act as anti-inflammatories, regenerate bone, and act as a muscle relaxer.

A problem with cannabinoids lies with their dosing and delivery methods. Cannabinoids are lipophilic and potentially acid-labile compounds. Because of their hydrophobic nature, cannabinoids are poorly absorbed systemically because of the poor dissolution of cannabinoids in the aqueous environment of gastrointestinal tract. As such, many forms of cannabinoids exhibit low bioavailability. In addition, cannabinoids have relatively low thermal stability (130° C. for decomposition) making the administration and prolonged storage of cannabinoids in a number of forms difficult to achieve on a sustained basis.

In recent years, a number of sustained release systems have been developed to aid other compounds having poor bioavailability maintain efficacy. Once such compound, salicylic acid, has recently been formulated as a slow degrading polymer for sustained drug delivery. See, U.S. Pat. No. 8,741,317.

Although chemically very different, similar issues are found in the availability of cannabinoids and salicylic acid, both for systemic and for topical applications.

Accordingly, there is a need for formulations of cannabinoids which increase bioavailability and increase thermal stability.

SUMMARY

In at least one aspect, a polymer that comprises a plurality of cannabinoid units.

In one embodiment, the polymer has the formula:

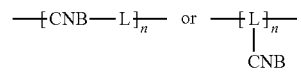

wherein:

CNB is a cannabinoid moiety,

L is a linking group; and n represents the number of repeat units wherein n is at least 2.

In certain embodiments of the polymer, each cannabinoid moiety is independently derived CBG, CBD, CBC, CBND, DHCBD, CBG-R, CBD-R, CBC-R, CBND-R, or DHCBD-R, wherein the cannabinoid moiety is bound to the linking group via hydroxyl groups, acid groups, or ester groups on the cannabinoid before polymerization.

In other embodiments of the polymer, each cannabinoid moiety has one of the following structures before polymerization, wherein the R group is $C_1$-$C_{10}$ alkyl optionally substituted with one or more heteroatoms, a heterocycloalkyl group, or a heteroaryl group, specifically $C_1$-$C_6$ alkyl, and more specifically n-pentyl or n-propyl; for the naturally occurring phytocannabinoids like CBD and CBG, R=methyl, ethyl, propyl, butyl, pentyl, hexyl, 4'-(3-carboxypropyl)-, 4'-(4-hydroxybutyl), 1,1-dimethylheptyl, 4'-[2-(1H-1,2,3-triazol-yl)ethyl]-, 4'-(2-morpholinoethyl)-, or 4'-(2-ethoxyethyl)-:

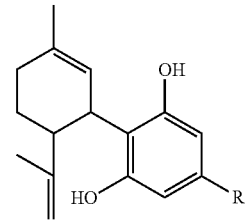

CBD for R = pentyl, CBD-R for other derivatives;

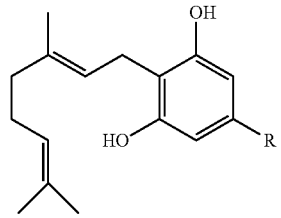

CBG for R = pentyl, CBG-R for other derivatives;

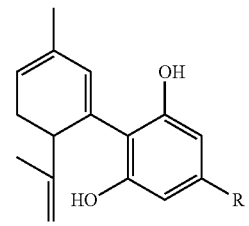

DHCBD for R = pentyl, DHCBD-R for other derivatives;

-continued

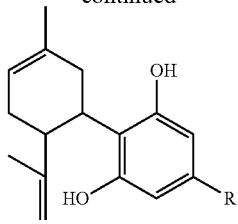

Δ8-CBD for R = pentyl, Δ8-CBD-R for other derivatives;

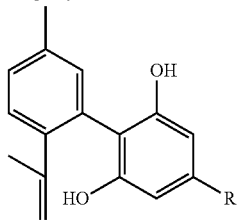

CBND for R = pentyl, CBND-R for other derivatives;

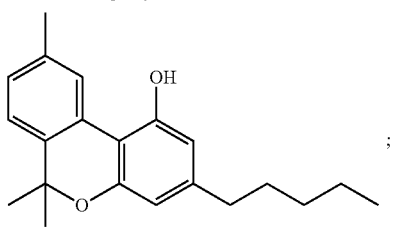

CBN

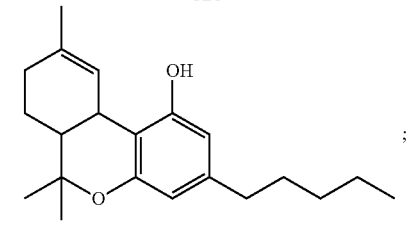

Δ9-THC

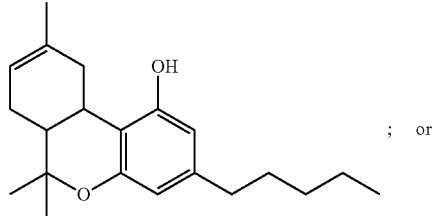

Δ8-THC

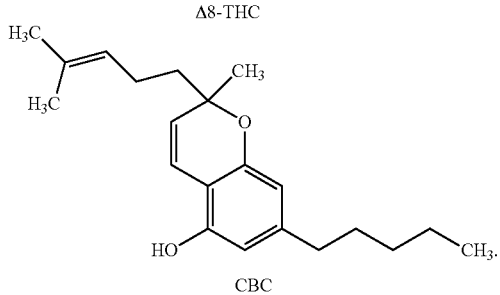

CBC

In certain embodiments of the polymer, the linking group is a linear or branched hydrocarbon chains containing from 3 to 50 carbon atoms, optionally interrupted with one or more oxygen atoms or aromatic groups. In certain embodiments, the linking group is interrupted with one or more benzyl groups.

In some embodiments of the polymer, the linking groups are monomers which polymerize to form vinyl polymers, polyurethanes, polyesters, polyethers, polyamides, polyimides, polyamino acids, polypeptides, or polysaccharides, or a combination thereof.

In other embodiments of the polymer, the polymer further comprises an endcapping group, wherein the endcapping group is defined by the type of polymerization and monomers used as is known in the art, or specifically endcapped with a cannabinoid moiety having one hydroxyl group, acid group, or ester group before reaction with the polymer. In certain embodiments, the endcapping group has the following structure before reaction with the polymer:

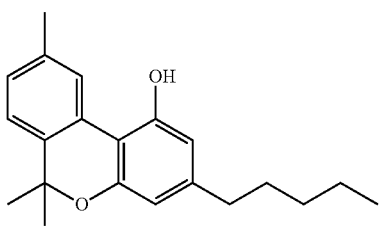

CBN

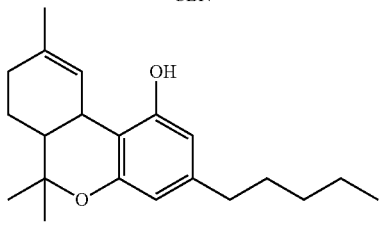

Δ9-THC

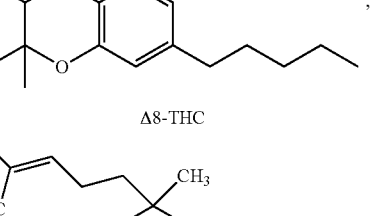

Δ8-THC

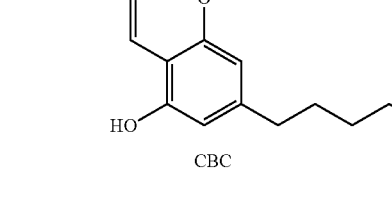

CBC

In certain embodiments of the polymer, the number average molecular weight of the polymer is about 1,000 daltons to about 60,000 daltons. In other embodiments of the polymer, the number average molecular weight of the polymer is about 7,000 daltons to about 40,000 daltons.

In another aspect, a pharmaceutical composition comprises a polycannabinoid polymer and a pharmaceutically acceptable carrier. In another aspect, a nutraceutical composition comprises a polycannabinoid polymer and optionally a carrier In yet another aspect, a method for delivering a cannabinoid to a patient in need thereof, comprises administering to the patient a therapeutically effective amount of a polycannabinoid.

In still another aspect, a method for treating a disease state in a patient, comprises administering to the patient a therapeutically effective amount of a polycannabinoid. In certain embodiments, the disease state is glaucoma, AIDS wasting, neuropathic pain, spasticity associated with multiple sclerosis, fibromyalgia chemotherapy-induced nausea, allergies, inflammation, infection, epilepsy, depression, migraine, bipolar disorders, anxiety disorder, drug dependency, withdrawal syndromes, and chronic pain.

In another aspect, a microsphere comprises the polycannabinoid.

In still another aspect, a film comprises the polycannabinoid.

In yet another aspect, a nonwoven fabric comprises the polycannabinoid.

In another aspect, a wound dressing comprises the polycannabinoid.

In still yet another aspect, a stent a catheter, or a catheter coating comprises the polycannabinoid.

In another aspect, a transdermal patch comprises the polycannabinoid.

DETAILED DESCRIPTION

Figure 1:
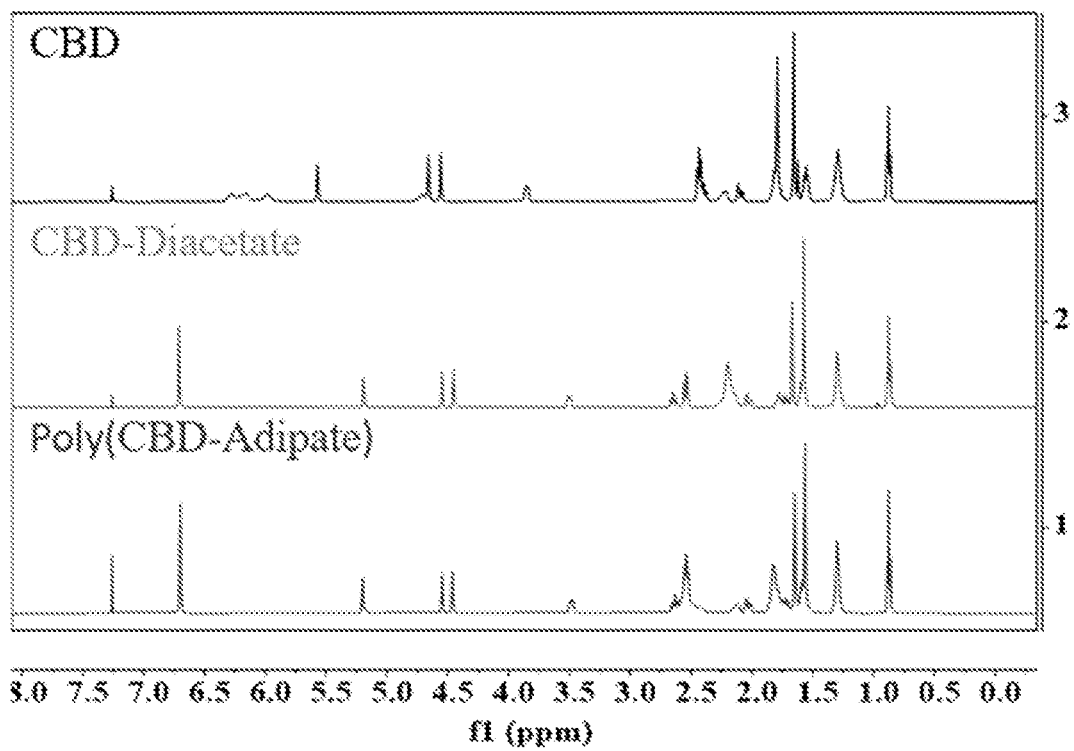
FIG. 1 shows the results of proton NMR of CBD, CBD-diacetate, and poly(CBD-adipate) polyester in deuterated chloroform. The CBD hydroxy peaks (ca. 5.5 ppm) are missing from both the polyester and the diacetate spectra, and the aromatic hydrogen peaks (6 to 6.4 ppm) have shifted to a higher ppm value of 6.7 ppm, indicating the phenol has converted to a less electron donating ester functionality.

The following is a detailed description provided to aid those skilled in the art in practicing the present disclosure. Those of ordinary skill in the art may make modifications and variations in the embodiments described herein without departing from the spirit or scope of the present disclosure. All publications, patent applications, patents, figures and other references mentioned herein are expressly incorporated by reference in their entirety.

Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

Where a range of values is provided, it is understood that each intervening value, to the tenth of the unit of the lower limit unless the context clearly dictates otherwise (such as in the case of a group containing a number of carbon atoms in which case each carbon atom number falling within the range is provided), between the upper and lower limit of that range and any other stated or intervening value in that stated range is encompassed within the disclosure. The upper and lower limits of these smaller ranges may independently be included in the smaller ranges is also encompassed within the disclosure, subject to any specifically excluded limit in the stated range. Where the stated range includes one or both of the limits, ranges excluding either both of those included limits are also included in the disclosure.

All numerical values within the detailed description and the claims herein are modified by "about" or "approximately" the indicated value, and take into account experimental error and variations that would be expected by a person having ordinary skill in the art.

The following terms are used to describe the present disclosure. Unless otherwise defined, all technical and scientific terms used herein have the same meaning as commonly understood by one of ordinary skill in the art to which this disclosure belongs. The terminology used in the description is for describing particular embodiments only and is not intended to be limiting of the disclosure.

The articles "a" and "an" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

As used herein in the specification and in the claims, the phrase "at least one," in reference to a list of one or more elements, should be understood to mean at least one element selected from anyone or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, in certain methods described herein that include more than one step or act, the order of the steps or acts of the method is not necessarily limited to the order in which the steps or acts of the method are recited unless the context indicates otherwise.

It should also be understood that, in certain methods described herein that include more than one step or act, the order of the steps or acts of the method is not necessarily limited to the order in which the steps or acts of the method are recited unless the context indicates otherwise.

The terms "co-administration" and "co-administering" or "combination therapy" refer to both concurrent administration (administration of two or more therapeutic agents at the same time) and time varied administration (administration of one or more therapeutic agents at a time different from that of the administration of an additional therapeutic agent or agents), as long as the therapeutic agents are present in the patient to some extent, specifically at effective amounts, at the same time. In certain specific aspects, one or more of the present compounds described herein, are coadministered in combination with at least one additional bioactive agent, especially including an anticancer agent or anti-inflammatory agent. In particular aspects, the co-administration of compounds results in synergistic activity and/or therapy, including anticancer activity or anti-inflammatory activity.

The term "compound", as used herein, unless otherwise indicated, refers to any specific chemical compound disclosed herein and includes tautomers, regioisomers, geometric isomers, and where applicable, stereoisomers, including optical isomers (enantiomers) and other stereoisomers (diastereomers) thereof, as well as pharmaceutically or cosmetically acceptable salts and derivatives, including prodrug and/or deuterated forms thereof where applicable, in context. Deuterated small molecules contemplated are those in which one or more of the hydrogen atoms contained in the drug molecule have been replaced by deuterium.

Within its use in context, the term compound generally refers to a single compound, but also may include other compounds such as stereoisomers, regioisomers and/or optical isomers (including racemic mixtures) as well as specific enantiomers or enantiomerically enriched mixtures of disclosed compounds. The term also refers, in context to prodrug forms of compounds which have been modified to facilitate the administration and delivery of compounds to a site of activity. It is noted that in describing the present compounds, numerous substituents and variables associated with same, among others, are described. It is understood by those of ordinary skill that molecules which are described herein are stable compounds as generally described hereunder. When the bond is shown, both a double bond and single bond are represented or understood within the context of the compound shown and well-known rules for valence interactions.

As used herein, "alkyl" includes straight chain, branched, and cyclic saturated aliphatic hydrocarbon groups, having the specified number of carbon atoms, generally from 1 to about 20 carbon atoms, greater than 3 for the cyclic. Alkyl groups described herein typically have from 1 to about 20, specifically 3 to about 18, and more specifically about 6 to about 12 carbons atoms. Examples of alkyl include, but are not limited to, methyl, ethyl, n-propyl, isopropyl, n-butyl, 3-methylbutyl, t-butyl, n-pentyl, and sec-pentyl. As used herein, "cycloalkyl" indicates a monocyclic or multicyclic saturated or unsaturated hydrocarbon ring group, having the specified number of carbon atoms, usually from 3 to about 10 ring carbon atoms. Monocyclic cycloalkyl groups typically have from 3 to about 8 carbon ring atoms or from 3 to about 7 carbon ring atoms. Multicyclic cycloalkyl groups may have 2 or 3 fused cycloalkyl rings or contain bridged or caged cycloalkyl groups. Examples of cycloalkyl groups include cyclopropyl, cyclobutyl, cyclopentyl, or cyclohexyl as well as bridged or caged saturated ring groups such as norbornane or adamantane.

The term "heterocycloalkyl" is used to indicate saturated cyclic groups containing from 1 to about 3 heteroatoms chosen from N, O, and S, with remaining ring atoms being carbon. Heterocycloalkyl groups have from 3 to about 8 ring atoms, and more typically have from 5 to 7 ring atoms. A $C_2$-$C_7$ heterocycloalkyl group contains from 2 to about 7 carbon ring atoms and at least one ring atom chosen from N, O, and S. Examples of heterocycloalkyl groups include morpholinyl, piperazinyl, piperidinyl, and pyrrolidinyl groups.

As used herein, "heteroaryl" indicates a stable 5- to 7-membered monocyclic or 7- to 10-membered bicyclic heterocyclic ring which contains at least 1 aromatic ring that contains from 1 to 4, or specifically from 1 to 3, heteroatoms chosen from N, O, and S, with remaining ring atoms being carbon. When the total number of S and O atoms in the heteroaryl group exceeds 1, these heteroatoms are not adjacent to one another. In a specific embodiment, the total number of S and O atoms in the heteroaryl group is not more than 2. Examples of heteroaryl groups include, but are not limited to, pyridyl, indolyl, pyrimidinyl, pyridizinyl, pyrazinyl, imidazolyl, oxazolyl, furanyl, thiophenyl, thiazolyl, triazolyl, tetrazolyl, isoxazolyl, quinolinyl, pyrrolyl, pyrazolyl, and 5,6,7,8-tetrahydroisoquinoline.

The term "patient" or "subject" is used throughout the specification to describe an animal, specifically a human or a domesticated animal, to whom treatment, including prophylactic treatment, with the compositions according to the present disclosure is provided. For treatment of those infections, conditions or disease states which are specific for a specific animal such as a human patient, the term patient refers to that specific animal, including a domesticated animal such as a dog or cat or a farm animal such as a horse, cow, sheep, etc. In general, in the present disclosure, the term patient refers to a human patient unless otherwise stated or implied from the context of the use of the term.

The term "effective" is used to describe an amount of a compound, composition or component which, when used within the context of its intended use, effects an intended result. The term effective subsumes all other effective amount or effective concentration terms, which are otherwise described or used in the present application.

Cannabinoid Polymers

In one aspect, a polycannabinoid polymer comprises a plurality of cannabinoid units, specifically phytocannabinoid units. As used herein the term "Cannabinoid polymer(s)" and "polycannabinoid(s)" refer to a polymer comprising plurality of cannabinoid units.

In certain embodiments, the cannabinoid polymer is a polymer comprising a plurality of cannabinoid units of the formula:

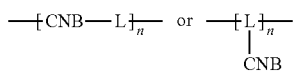

wherein:
CNB is a cannabinoid unit,
L is a linking group; and
n represents the number of repeat units wherein n is at least 2.

The cannabinoid units may be the same or different. In certain embodiments, each cannabinoid unit is independently CBG, CBD, CBC, CBND, DHCBD, CBG-R, CBD-R, CBC-R, CBND-R, DHCBD-R wherein the cannabinoid unit is bound to the linking group via hydroxyl groups, acid groups, or ester groups on the cannabinoid unit before polymerization. Additional cannabinoids and cannabinoid derivatives can be found, for example, in Morales P, Reggio PH and Jagerovic N (2017) An Overview on Medicinal Chemistry of Synthetic and Natural Derivatives of Cannabidiol. *Front. Pharmacol.* 8:422, the contents of which are incorporated herein in their entirety by reference.

| Cannabinoid Abbreviation | Cannabinoid |
|---|---|
| CBC | cannabichromene |
| CBC-R | substituted cannabichromene |
| CBD | cannabidiol |
| CBD-R | substituted cannabidiol |
| CBG | cannabigerol |
| CBG-R | substituted cannabigerol |
| DHCBD | dihydrocannabidiol |
| DHCBD -R | substituted dihydrocannabidiol |
| CBND | cannabinodiol |
| CBND-R | substituted cannabinodiol |

In certain embodiments, each cannabinoid unit may be the same or different and each has one of the following structures before polymerization, wherein the R group is $C_1$-$C_{10}$ alkyl optionally substituted with one or more heteroatoms, a heterocycloalkyl group, or a heteroaryl group, specifically $C_1$-$C_6$ alkyl, and more specifically n-pentyl or n-propyl; for the naturally occurring phytocannabinoids like CBD and CBG, R=methyl, ethyl, propyl, butyl, pentyl, hexyl, 4'-(3-carboxypropyl)-, 4'-(4-hydroxybutyl), 1,1-dimethylheptyl, 4'-[2-(1H-1,2,3-triazol-yl)ethyl]-, 4'-(2-morpholinoethyl)-, 4'-(2-ethoxyethyl)-:

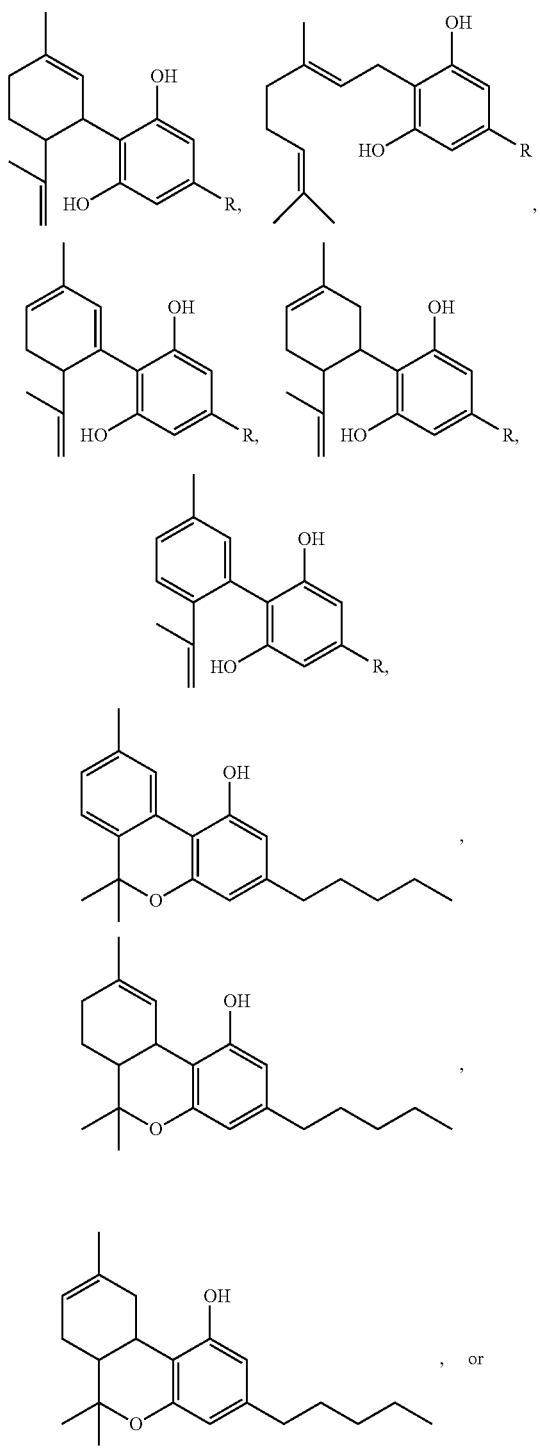

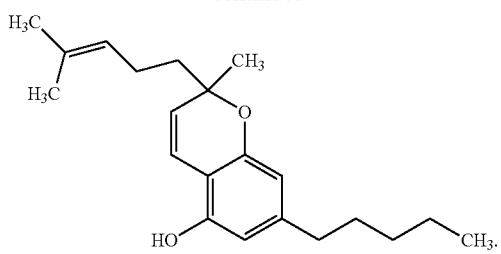
In certain embodiments, each cannabinoid unit may be the same or different and each has one of the following structures before polymerization:
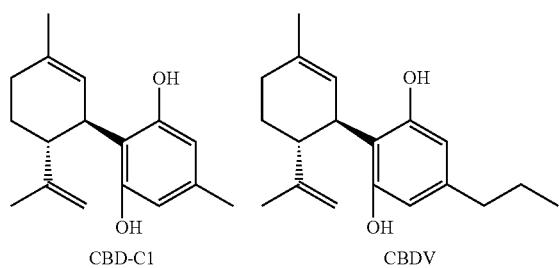
CBD-C1
CBDV
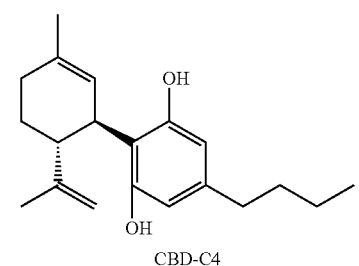
CBD-C4
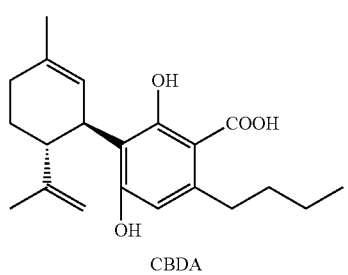
CBDA
CBDVA-C3
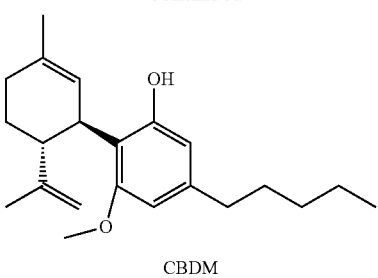
CBDM
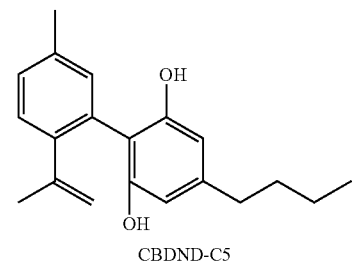
CBDND-C5
CBDND-C3
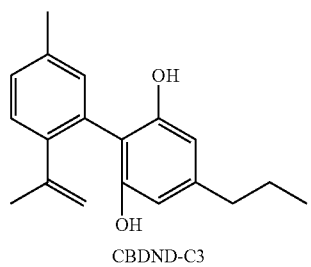
7-COOH-CBD
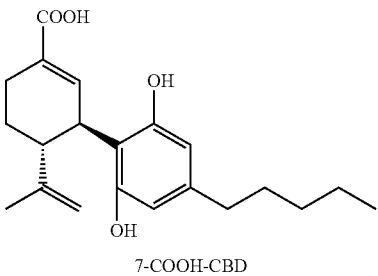
7-OH-CBD
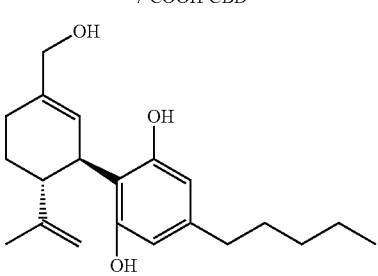
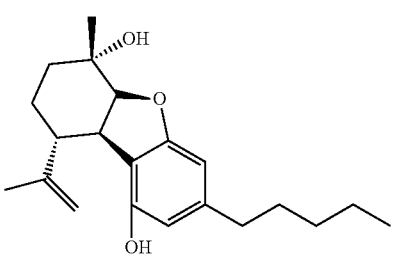
CBE -continued
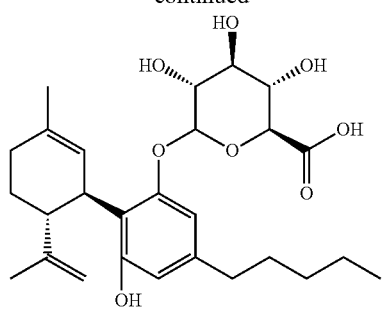
2′O-Glucuronide-CBD
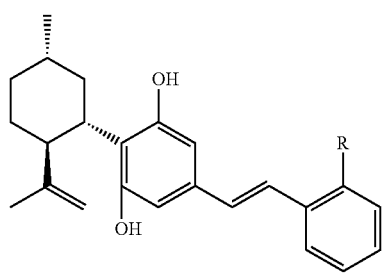
R = H; Machaeridiol A
R = OH; Machaeridiol B
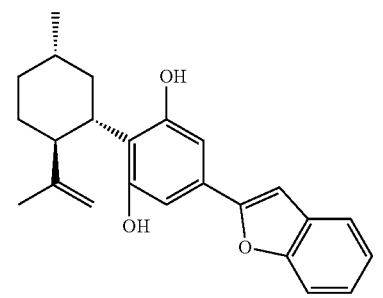
Machaeridiol C
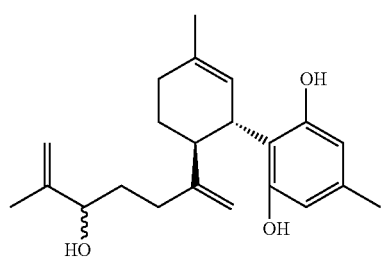
Ferruginene C
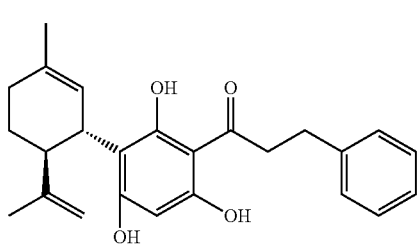
Linderatin
-continued
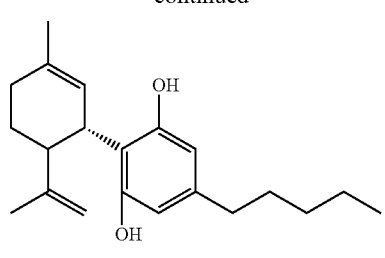
(+)-CBD
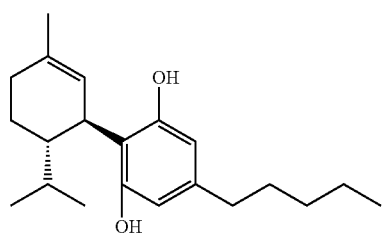
H$_2$-CBD
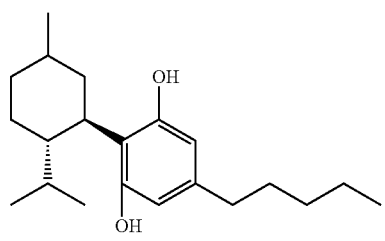
H$_4$-CBD
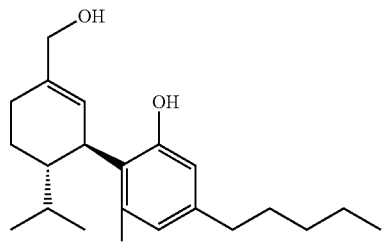
HU-446
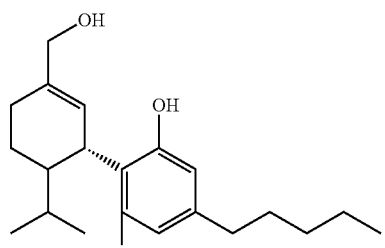
HU-465
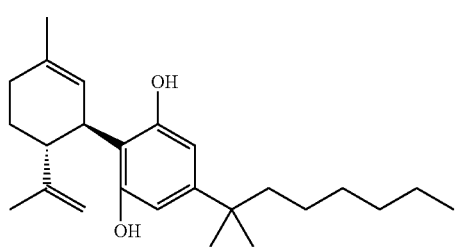
(−)-DMH-CBD -continued
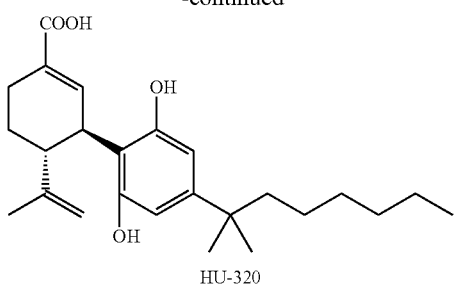
HU-320
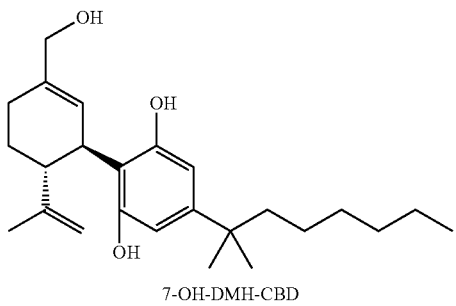
7-OH-DMH-CBD
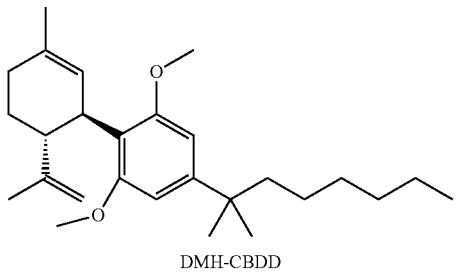
DMH-CBDD
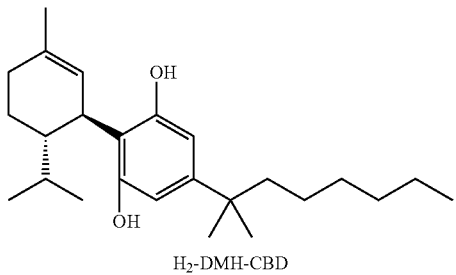
H₂-DMH-CBD
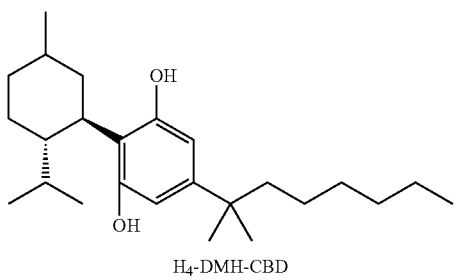
H₄-DMH-CBD
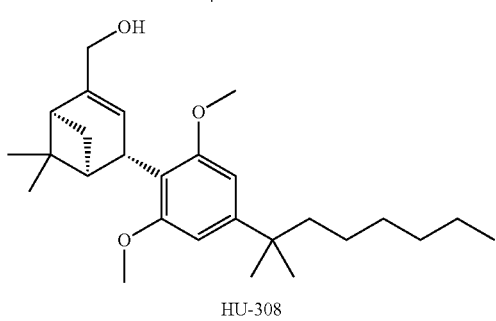
HU-308
-continued
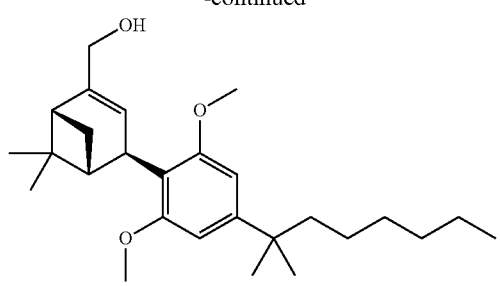
HU-433
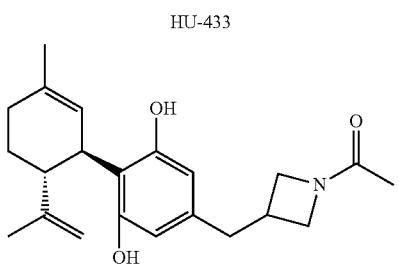
KLS-13019
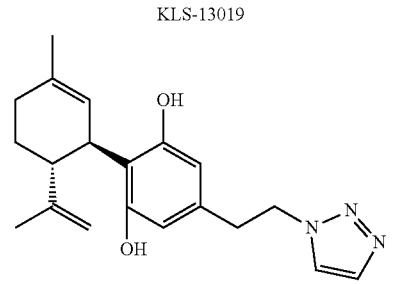
4′-[2-(1H-1,2,3-Triazol-yl)ethyl]-CBD
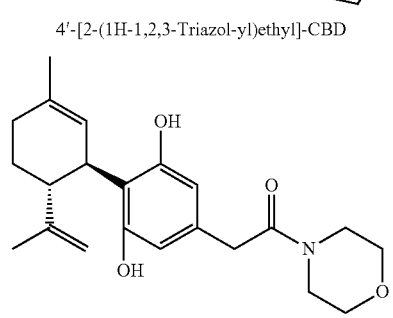
4′-(2-Morpholinoethyl)-CBD
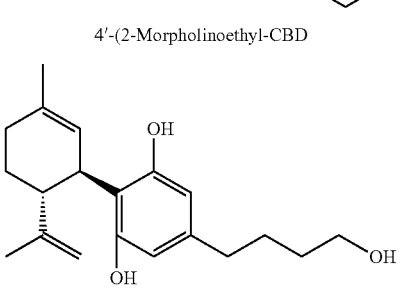
4′-(4-Hydroxybutyl)-CBD
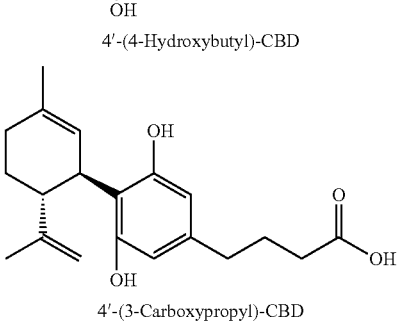
4′-(3-Carboxypropyl)-CBD -continued
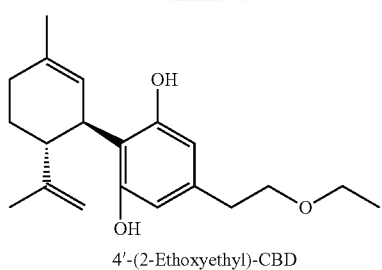
4′-(2-Ethoxyethyl)-CBD
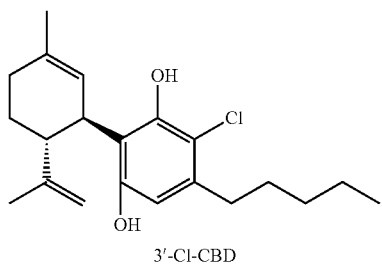
3′-Cl-CBD
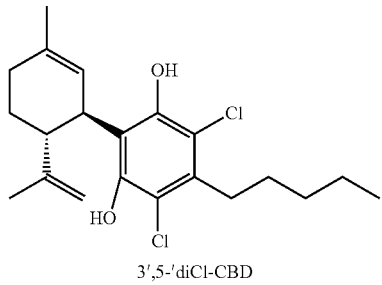
3′,5-′diCl-CBD
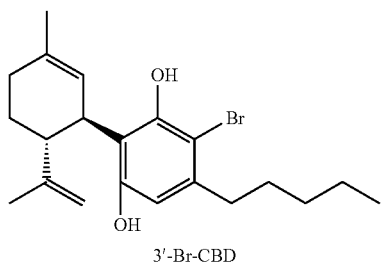
3′-Br-CBD
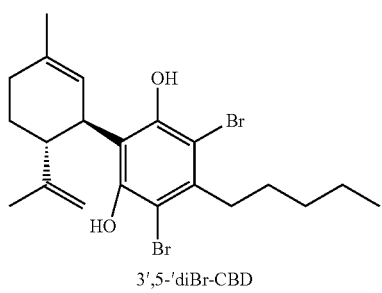
3′,5-′diBr-CBD
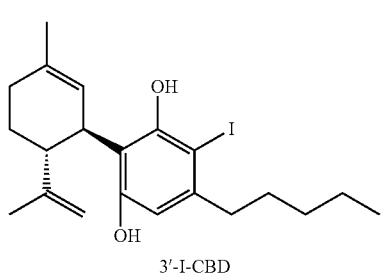
3′-I-CBD
-continued
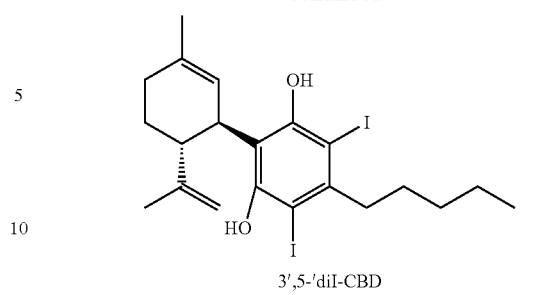
3′,5-′diI-CBD
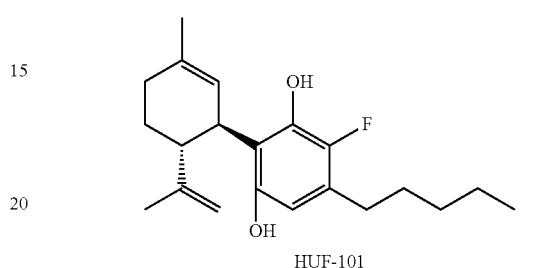
HUF-101
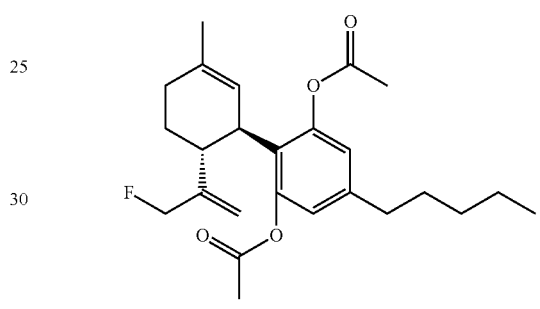
HUF-102
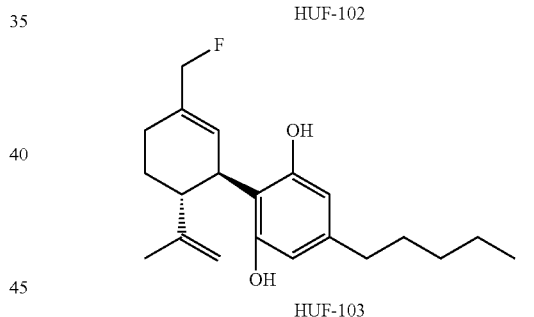
HUF-103
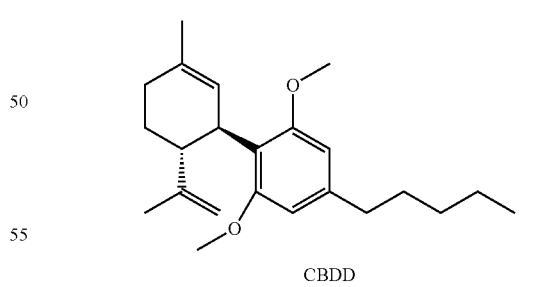
CBDD
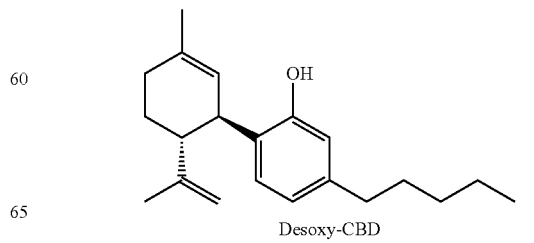
Desoxy-CBD

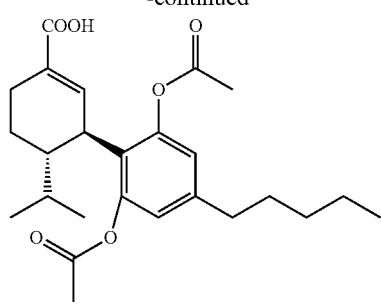
HU-444
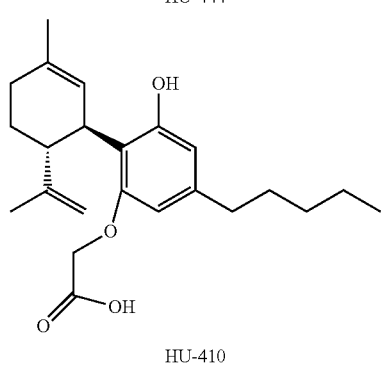
HU-410
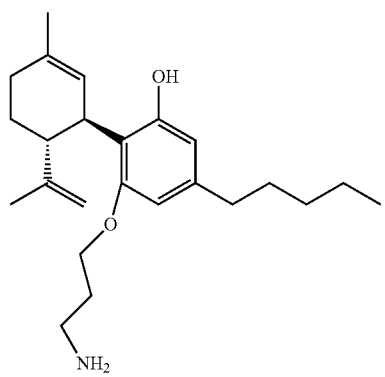
HU-427
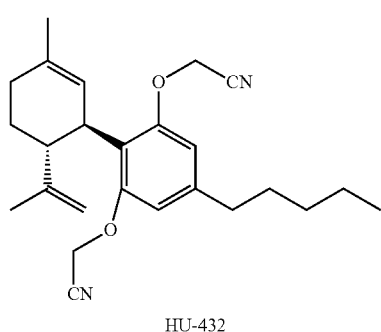
HU-432
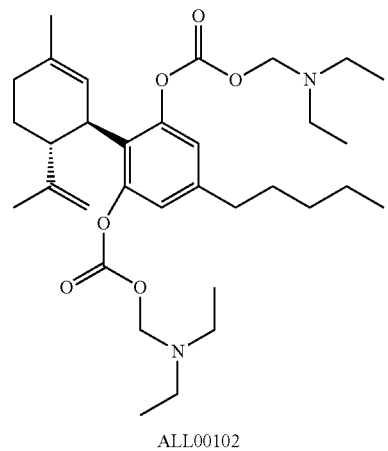
ALL00102
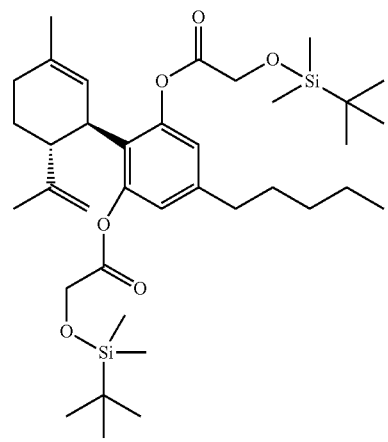
ALL00147
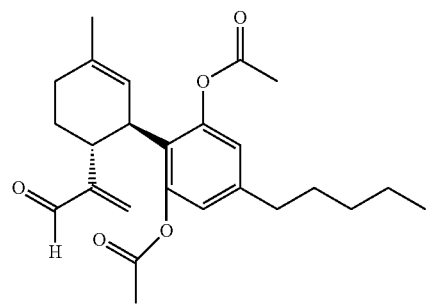
CBD-aldehyde-diacetate
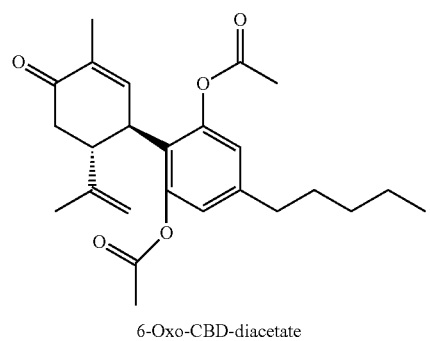
6-Oxo-CBD-diacetate

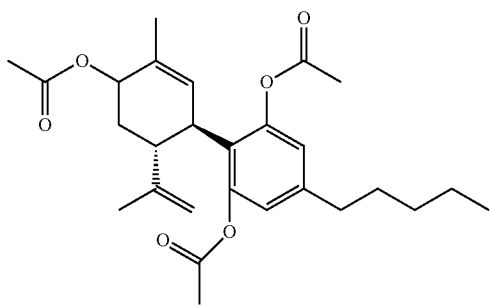

6-Hydroxy-CBD-triacetate

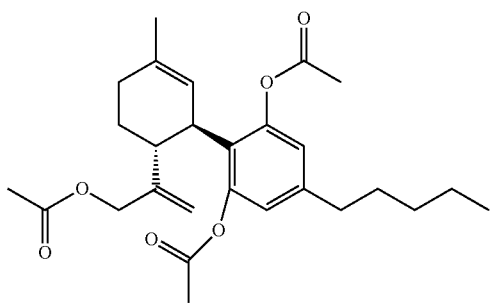

9-Hydroxy-CBD-triacetate

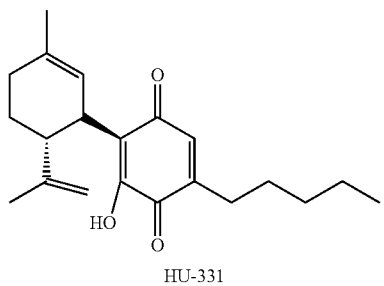

HU-331

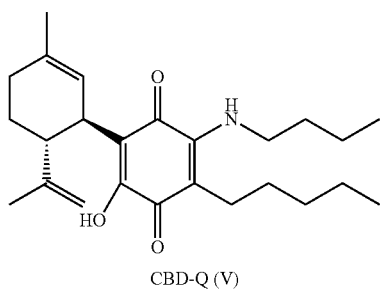

CBD-Q (V)

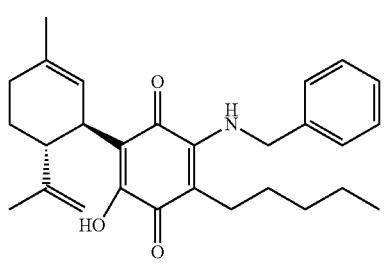

CBD-Q (VIII)

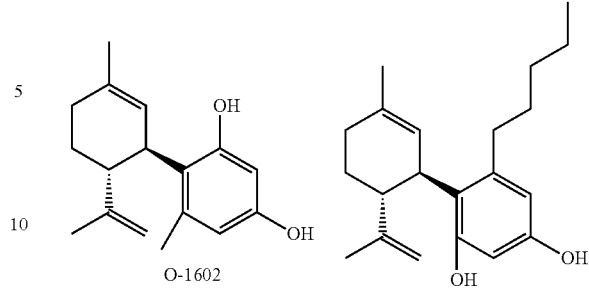

O-1602

Abn-CBD

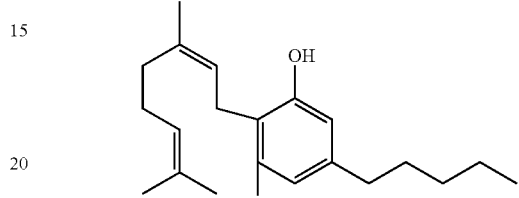

CBG

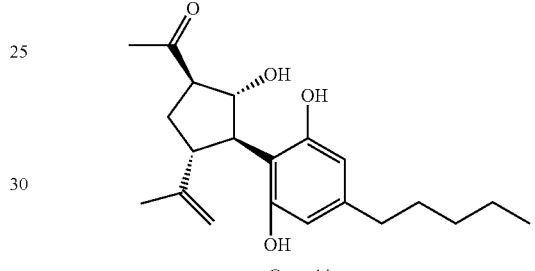

Cannabimovone

The polymer is formed by reacting the hydroxyl or other reactive functionalities, such as the diacetate or similar esters made from the hydroxyls on the cannabinoid unit or cannabinoid derivative with an electrophilic difunctional comonomer to produce the linkers, L.

In certain embodiments, the linking group which generally binds the cannabinoid unit are via linear or branched hydrocarbon chains containing from 3 to 50 carbon atoms, optionally interrupted with one or more oxygen atoms, these chains can be alkyl, alkenyl or alkynyl chains containing from 3 to 50 carbon atoms, or else polyether chains containing from 3 to 50 carbon atoms, it being possible for these chains to be substituted with hydrophilic groups (hydroxyl groups, for example). The chains binding the cannabinoid units to one another contain at least 3 carbon atoms and specifically from 4 to 50 carbon atoms, the shortest path between two cannabinoid units specifically consisting of a chain containing between 3 and 8 carbon atoms.

Advantageously, the linking groups which link two cannabinoid units to one another may include linking groups of the general formula —O—(CH$_2$—CHOR$^1$—CH$_2$)$_m$—O—, where m is an integer between 1 and 50 (generally between 2 and 10) and where, in each of the n units (CH$_2$—CHOR$^1$—CH$_2$), R$^1$ denotes either a hydrogen atom or a —CH$_2$—CHOH—CH$_2$—O— chain bound to a cannabinoid unit of the polymer.

The polymers can be obtained by coupling of cannabinoid molecules with bifunctional compounds capable of forming covalent bonds with the hydroxyl groups of the cannabinoid. For example, they may be dicarboxylic acids such as citric acid, sebacic acid, fumaric acid, glutamic acid, maleic acid, malic acid, malonic acid, oxalic acid, succinic acid, glutaric acid, terephthalic acid, isophthalic acid, oxaloacetic acid, phthalic acid, adipic acid or butanedioic acid.

Known linking groups can be used. Representative specific examples of the linking groups are those monomers which polymerize to form vinyl polymers, polyurethanes, polyesters, polyethers, polyamides, polyimides, polyamino acids, polypeptides, polysaccharides, and the like. When the linking group is a vinyl monomer, specific examples of the vinyl polymer include (meth)acrylic monomers, styrene monomers, (meth)acrylamide monomers, ethylene monomers, propylene monomers, oxyethylene monomers, ethylene glycol monomers, propylene glycol monomers, monomers of vinyl alcohol, vinyl acetate monomers, vinyl chloride monomers, and the like. As used herein, (meth) acrylate refers to acrylate or methacrylate, and (meth)acrylic refers to methacrylic or acrylic.

Examples of (meth)acrylic monomers include (meth) acrylic acids and salts thereof, and (meth)acrylic acid esters such as methyl (meth)acrylate, ethyl (meth)acrylate, hydroxymethyl (meth)acrylate, and hydroxyethyl (meth) acrylate. Examples of styrene monomers include styrene, styrene sulfonates, and the like. Examples of (meth)acrylamide polymers include (meth)acrylamides, and (meth) acrylamide derivatives such as dimethyl (meth)acrylamide, diethyl (meth)acrylamide, N-isopropylacrylamide, and N-benzylacrylamide. The linking group monomers are not limited to those mentioned above as examples. Conventionally known vinyl monomers are also usable.

The cannabinoid polymer may be a homopolymer, or a copolymer obtained by copolymerzing monomers. When the cannabinoid polymer is a copolymer with one or more additional polymers, the additional polymers may be any of random copolymers, alternating copolymers, graft copolymers, or block copolymers. The side chain of the additional polymers may be substituted with a functional group. That is, as long the desired effect of the cannabinoid polymer is not impaired, the main chain and side chains of the additional polymers may be modified with other substituents by chemical bonds or the like.

In certain embodiments, the cannabinoid monomer can be incorporated into a thermoplastic polymer or a biodegradeable polymer.

Suitable thermoplastic polymers include, but are not limited to polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid) polymers, polymaleic anhydrides, poly(methylvinyl) ethers, poly(amino acids), chitin, chitosan, polythiocarbonates, polythiourethanes, and copolymers, terpolymers, or combinations or mixtures of the above materials.

Examples of biodegradable polymers and oligomers suitable for use in the compositions and methods include, but are not limited to: poly(lactide)s; poly(glycolide)s; poly (lactide-co-glycolide)s; poly(lactic acid)s; poly(glycolic acid)s; and poly(lactic acid-co-glycolic acid)s; poly(caprolactone)s; poly(malic acid)s; polyamides; polyanhydrides; polyamino acids; polyorthoesters; polyetheresters; polycyanoacrylates; polyphosphazines; polyphosphoesters; polyesteramides; polydioxanones; polyacetals; polyketals; polycarbonates; polyorthocarbonates; degradable polyurethanes; polyhydroxybutyrates; polyhydroxyvalerates; polyalkylene oxalates; polyalkylene succinates; chitins; chitosans; oxidized celluloses; and copolymers, terpolymers, blends, combinations or mixtures of any of the above materials.

As used herein, "hydrophobic" refers to a polymer that is substantially not soluble in water. As used herein, "hydrophilic" refers to a polymer that may be water-soluble or to a polymer having affinity for absorbing water, but typically not when covalently linked to the hydrophobic component as a co-polymer, and which attracts water into the device.

The cannabinoid unit can be incorporated into hydrophilic polymers. Hydrophilic polymers suitable for use herein can be obtained from various commercial, natural or synthetic sources well known in the art. Suitable hydrophilic polymers include, but are not limited to: polyanions including anionic polysaccharides such as alginate; agarose; heparin; polyacrylic acid salts; polymethacrylic acid salts; ethylene maleic anhydride copolymer (half ester); carboxymethyl amylose; carboxymethyl cellulose; carboxymethyl dextran; carboxymethyl starch; carboxymethyl chitin/chitosan; carboxy cellulose; 2,3-dicarboxycellulose; tricarboxycellulose; carboxy gum arabic; carboxy carrageenan; carboxy pectin; carboxy tragacanth gum; carboxy xanthan gum; carboxy guar gum; carboxy starch; pentosan polysulfate; curdlan; inositol hexasulfate; beta.-cyclodextrin sulfate; hyaluronic acid; chondroitin-6-sulfate; dermatan sulfate; dextran sulfate; heparin sulfate; carrageenan; polygalacturonate; polyphosphate; polyaldehydo-carbonic acid; poly-1-hydroxy-1-sulfonate-propen-2; copolystyrene maleic acid; mesoglycan; sulfopropylated polyvinyl alcohols; cellulose sulfate; protamine sulfate; phospho guar gum; polyglutamic acid; polyaspartic acid; polyamino acids; and any derivatives or combinations thereof. One skilled in the art will appreciate other hydrophilic polymers that are also within the scope of the present invention.

The cannabinoid unit can be incorporated into various water-soluble polymers. Water-soluble polymers include, but are not limited to: poly (alkyleneglycol), polyethylene glycol ("PEG"); propylene glycol; ethylene glycol/propylene glycol copolymers; carboxylmethylcellulose; dextran; polyvinyl alcohol ("PVOH"); polyvinyl pyrolidone; poly (alkyleneamine)s; poly (alkyleneoxide)s; poly-1,3-dioxolane; poly-1,3,6-trioxane; ethylene/maleic anhydride copolymers; polyaminoacids; poly (n-vinyl pyrolidone); polypropylene oxide/ethylene oxide copolymers; polyoxyethylated polyols; polyvinyl alcohol succinate; glycerine; ethylene oxides; propylene oxides; poloxamers; alkoxylated copolymers; water soluble polyanions; and any derivatives or combinations thereof. In addition, the water-soluble polymer may be of any suitable molecular weight, and may be branched or unbranched.

In certain embodiments, the cannabinoid polymers can be endcapped with a suitable monomer having a singularly reactive monomer. The endcap can be any group which does not alter the polymer properties or reduce the efficacy of the cannabinoid units. In particular embodiments, the endcap groups can be, independently, a linear or branched alcohol, or a singly reactive cannabinoid unit, for example, a cannabinoid unit having only one hydroxy group, one acid group, or one ester group. In certain embodiments, the endcap may have additional reactive cites which are protected during the reaction with the polymer and are later deprotected to provide additional reactive functionality to the polymer. In certain embodiments, each singly reactive cannabinoid unit has the structure:

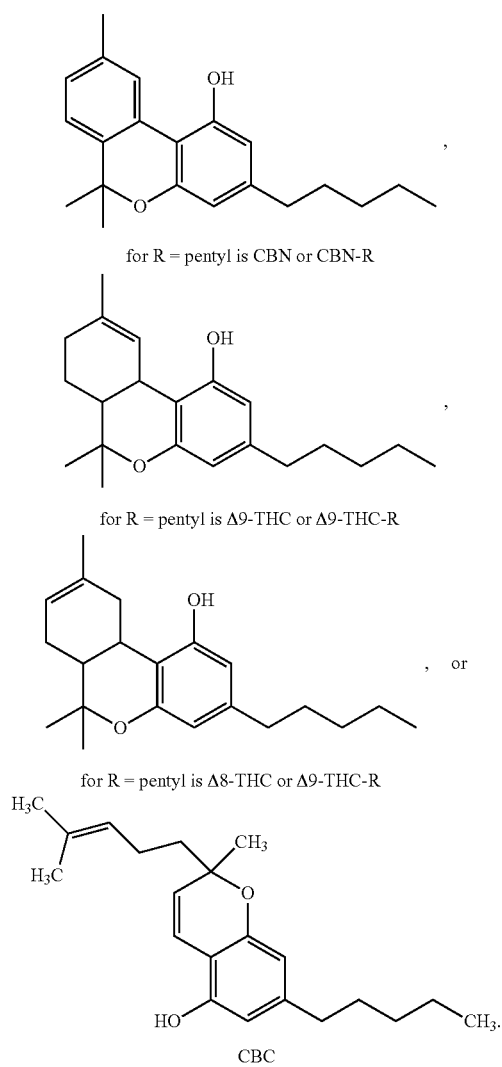

for R = pentyl is CBN or CBN-R for R = pentyl is Δ9-THC or Δ9-THC-R

, or for R = pentyl is Δ8-THC or Δ9-THC-R

CBC

In general. the cannabinoid polymers have a number average molecular weight of about 1,000 daltons to about 60,000 daltons. In certain embodiment, the cannabinoid polymers has a number average molecular weight of about 5,000 daltons to about 55,000 daltons, a number average molecular weight of about 6,000 daltons to about 50,000 daltons, a number average molecular weight of about 7,000 daltons to about 50,000 daltons, a number average molecular weight of about 9,000 to about 40,000 daltons, or a number average molecular weight of about 10,000 to about 30,000 daltons.

Methods of Preparation

The particular process to be utilized in the preparation of the cannabinoid polymers depends upon the specific polymers desired. Such factors as the selection of the specific substituents play a role in the path to be followed in the preparation of the specific compounds. Those factors are readily recognized by one of ordinary skill in the art.

The cannabinoid polymers may be prepared by use of known chemical reactions and procedures. Nevertheless, the following general preparative methods are presented to aid the reader in synthesizing the compounds, with more detailed particular examples being presented below in the experimental section describing the working examples.

The cannabinoid polymers can be made according to conventional chemical methods, and/or as disclosed below, from starting materials which are either commercially available or producible according to routine, conventional chemical methods. General methods for the preparation of the compounds are given below, and the preparation of representative compounds is specifically illustrated in examples.

Synthetic transformations that may be employed in the synthesis of compounds described herein and in the synthesis of intermediates involved in the synthesis of compounds described herein are known by or accessible to one skilled in the art. Collections of synthetic transformations may be found in compilations, such as:

J. March. Advanced Organic Chemistry, 4th ed.; John Wiley: New York (1992)

R. C. Larock. Comprehensive Organic Transformations, 2nd ed.; Wiley-VCH: New York (1999)

F. A. Carey; R. J. Sundberg. Advanced Organic Chemistry, 2nd ed.; Plenum Press: New York (1984)

T. W. Greene; P. G. M. Wuts. Protective Groups in Organic Synthesis, 3rd ed.; John Wiley: New York (1999)

L. S. Hegedus. Transition Metals in the Synthesis of Complex Organic Molecules, 2nd ed.; University Science Books: Mill Valley, CA (1994)

L. A. Paquette, Ed. The Encyclopedia of Reagents for Organic Synthesis; John Wiley: New York (1994)

A. R. Katritzky; O. Meth-Cohn; C. W. Rees, Eds. Comprehensive Organic Functional Group Transformations; Pergamon Press: Oxford, UK (1995)

G. Wilkinson; F. G A. Stone; E. W. Abel, Eds. Comprehensive Organometallic Chemistry; Pergamon Press: Oxford, UK (1982)

B. M. Trost; I. Fleming. Comprehensive Organic Synthesis; Pergamon Press: Oxford, UK (1991)

A. R. Katritzky; C. W. Rees Eds. Comprehensive Heterocylic Chemistry; Pergamon Press: Oxford, UK (1984)

A. R. Katritzky; C. W. Rees; E. F. V. Scriven, Eds. Comprehensive Heterocylic Chemistry II; Pergamon Press: Oxford, UK (1996)

C. Hansch; P. G. Sammes; J. B. Taylor, Eds. Comprehensive Medicinal Chemistry: Pergamon Press: Oxford, UK (1990).

In addition, recurring reviews of synthetic methodology and related topics include Organic Reactions; John Wiley: New York; Organic Syntheses; John Wiley: New York; Reagents for Organic Synthesis: John Wiley: New York; The Total Synthesis of Natural Products; John Wiley: New York; The Organic Chemistry of Drug Synthesis; John Wiley: New York; Annual Reports in Organic Synthesis; Academic Press: San Diego CA; and Methoden der Organischen Chemie (Houben-Weyl); Thieme: Stuttgart, Germany. Furthermore, databases of synthetic transformations include Chemical Abstracts, which may be searched using either CAS OnLine or SciFinder, Handbuch der Organischen Chemie (Beilstein), which may be searched using SpotFire, and REACCS.

The general methods to make cannabinoid polymers described herein are illustrated in Reaction Schemes 1-4.

The cannabinoid polymers may be formed by solventless procedures (melt polymerizations) as well as those requiring solvent including combinations of pure monomers if both are liquids (includes the melting of CBD or other cannabinoid to form a liquid, alternatively, the polymerization can be carried out in a solvent) or by interfacial polymerization.

Scheme 1

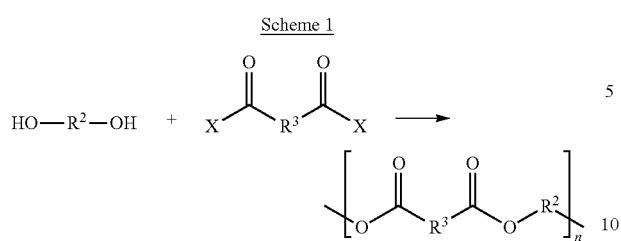

Scheme 1 presents a generic reaction scheme for the reaction of a cannabinoid diol monomer (HO—R²—OH) with a dicarbonyl monomer to produce a cannabinoid polyester. Equal equivalents of each will produce a high molecular weight polymer (Mn>20 kDa). The non-diol monomer could be a dicarboxylic acid, a diester, a dianhydride, a diacid chloride where X would be equal to —OH, O—R⁴, O—(C=O)—OR⁴ wherein R⁴ can be aliphatic, Cl, respectively. R³ could be aliphatic, branched aliphatic, halogenated (halogen includes fluorine, chlorine, bromine) aliphatic, halogenated branched aliphatic, aromatic, ethyleneoxy (linear or branched ether) or combinations thereof.

Scheme 2

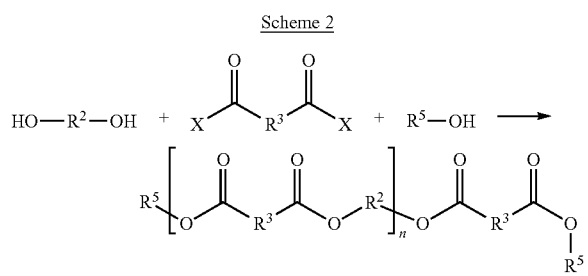

Scheme 2 presents a generic reaction scheme for the reaction of a cannabinoid diol monomer (HO—R²—OH) with a dicarbonyl monomer in the presence of a cannabinoid with single hydroxy (W—OH) to produce a cannabinoid polyester with cannabinoid endcaps. Endcapping can control the molecule weight of the polymer and can control the ratio of the two cannabinoids. The non-diol monomer could be a dicarboxylic acid, a diester, a dianhydride, a diacid chloride where X would be equal to —OH, O—R⁴, O—(C=O)—OR⁴, Cl, respectively.

Scheme 3

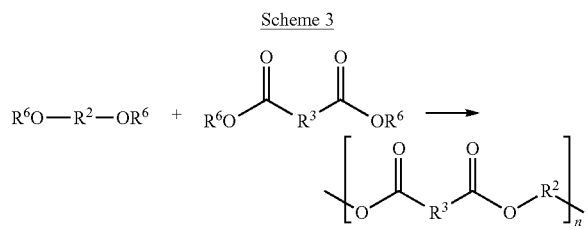

Scheme 3 shows a reaction in which diols are easily converted to (R⁶O—R²—OR⁶) a short ester such as a methyl or ethyl ester (R⁶=lower alkyl). The diester monomer can then be transesterified to produce a polyester.

Scheme 4

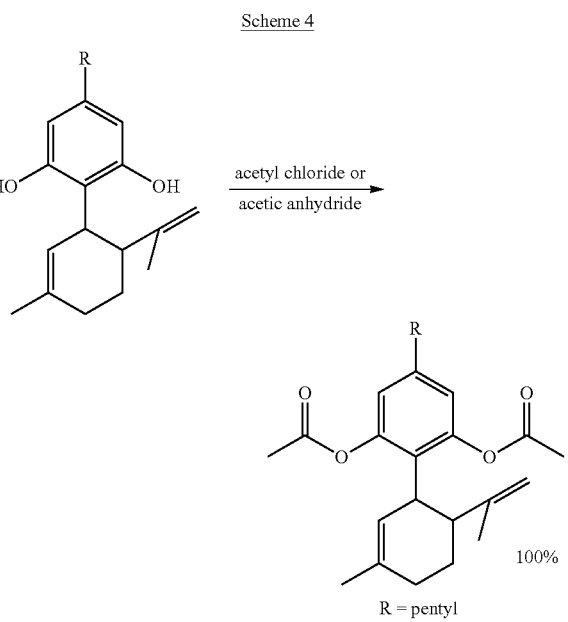

Scheme 4 shows, as a model for polymerization, CBD can be converted quantitatively to diacetyl CBD in accordance to the following reaction. Diacetyl CBD is a colorless liquid whereas CBD is a solid. Hence, diacetyl CBD can allow for a liquid phase polymerization without solvent with another monomer to produce a high molecular weight polymer. The other diols can undergo similar chemistry to make diacetyl monomers for transesterification.

The polycannabinoids can be altered by the type of polymer (polyester, polyurethane, polycarbonate) which will then alter the polymer properties. Flexibility in the backbone will result in low Tg materials that will be rubbery at room temperature whereas reducing the flexibility will increase the Tg making them a glassy solid. Cannabinoids have an exact stereochemistry, so polymerization with a symmetrical comonomer can produce semicrystalline polymers with the ability to be melt cast into films and fibers. Melt polymerization is also possible if the polymer generated is semicrystalline.

The cannabinoid polymers are thermally stable and stable against conversion of the target cannabinoid to another cannabinoid compound.

Methods of Use

Compositions comprising combinations of an effective amount of at least one cannabinoid polymer as described herein, and one or more of the compounds otherwise described herein, all in effective amounts, in combination with an effective amount of a carrier, additive or excipient, represents a further aspect of the present disclosure. The cannabinoid polymers described herein provide a unique cannabinoid delivery system through a variety of routes of administration; once present in the body it can biodegrade to the target cannabinoid compound.

The present disclosure includes, where applicable, the compositions comprising pharmaceutically acceptable salts, in particular, acid or base addition salts of compounds as described herein. The acids which are used to prepare the pharmaceutically acceptable acid addition salts of the aforementioned base compounds useful according to this aspect are those which form non-toxic acid addition salts, i.e., salts containing pharmacologically acceptable anions, such as the hydrochloride, hydrobromide, hydroiodide, nitrate, sulfate, bisulfate, phosphate, acid phosphate, acetate, lactate, citrate, acid citrate, tartrate, bitartrate, succinate, maleate, fumarate, gluconate, saccharate, benzoate, methanesulfonate, ethanesulfonate, benzenesulfonate, p-toluenesulfonate and pamoate [i.e., 1,1'-methylene-bis-(2-hydroxy-3 naphthoate)]salts, among numerous others.

Pharmaceutically acceptable base addition salts may also be used to produce pharmaceutically acceptable salt forms of the compounds or derivatives according to the present disclosure. The chemical bases that may be used as reagents to prepare pharmaceutically acceptable base salts of the present compounds that are acidic in nature are those that form non-toxic base salts with such compounds. Such non-toxic base salts include, but are not limited to those derived from such pharmacologically acceptable cations such as alkali metal cations (eg., potassium and sodium) and alkaline earth metal cations (eg, calcium, zinc and magnesium), ammonium or water-soluble amine addition salts such as N-methylglucamine-(meglumine), and the lower alkanolammonium and other base salts of pharmaceutically acceptable organic amines, among others.

The compounds as described herein may, in accordance with the disclosure, be administered in single or divided doses by the oral, parenteral or topical routes. Administration of the active compound may range from continuous (intravenous drip) to several oral administrations per day (for example, Q.I.D.) and may include oral, topical, parenteral, intramuscular, intravenous, sub-cutaneous, transdermal (which may include a penetration enhancement agent), buccal, sublingual and suppository administration, among other routes of administration. Enteric coated oral tablets may also be used to enhance bioavailability of the compounds from an oral route of administration. The most effective dosage form will depend upon the pharmacokinetics of the particular agent chosen as well as the severity of disease in the patient. Administration of compounds according to the present disclosure as sprays, mists, or aerosols for intra-nasal, intra-tracheal or pulmonary administration may also be used. The present disclosure therefore also is directed to compositions comprising an effective amount of compound as described herein, optionally in combination with a pharmaceutically or cosmetically acceptable carrier, additive or excipient. Compounds according to the present disclosure may be administered in immediate release, intermediate release or sustained or controlled release forms. Sustained or controlled release forms can be administered orally, but also in suppository and transdermal or other topical forms. Intramuscular injections in liposomal form may also be used to control or sustain the release of compound at an injection site.

The compositions as described herein may be formulated in a conventional manner using one or more pharmaceutically acceptable carriers and may also be administered in controlled-release formulations. Pharmaceutically acceptable carriers that may be used in these pharmaceutical compositions include, but are not limited to, ion exchangers, alumina, aluminum stearate, lecithin, serum proteins, such as human serum albumin, buffer substances such as phosphates, glycine, sorbic acid, potassium sorbate, partial glyceride mixtures of saturated vegetable fatty acids, water, salts or electrolytes, such as prolamine sulfate, disodium hydrogen phosphate, potassium hydrogen phosphate, sodium chloride, zinc salts, colloidal silica, magnesium trisilicate, polyvinyl pyrrolidone, cellulose-based substances, polyethylene glycol, sodium carboxymethylcellulose, polyacrylates, waxes, polyethylene-polyoxypropylene-block polymers, polyethylene glycol and wool fat.

The compositions as described herein may be administered orally, parenterally, by inhalation spray, topically, rectally, nasally, buccally, vaginally or via an implanted reservoir. The term "parenteral" as used herein includes subcutaneous, intravenous, intramuscular, intra-articular, intra-synovial, intrasternal, intrathecal, intrahepatic, intralesional and intracranial injection or infusion techniques. Specifically, the compositions are administered orally, intraperitoneally or intravenously.

Sterile injectable forms of the compositions as described herein may be aqueous or oleaginous suspension. These suspensions may be formulated according to techniques known in the art using suitable dispersing or wetting agents and suspending agents. The sterile injectable preparation may also be a sterile injectable solution or suspension in a non-toxic parenterally-acceptable diluent or solvent, for example as a solution in 1,3-butanediol. Among the acceptable vehicles and solvents that may be employed are water, Ringer's solution and isotonic sodium chloride solution. In addition, sterile, fixed oils are conventionally employed as a solvent or suspending medium. For this purpose, any bland fixed oil may be employed including synthetic mono- or di-glycerides. Fatty acids, such as oleic acid and its glyceride derivatives are useful in the preparation of injectables, as are natural pharmaceutically-acceptable oils, such as olive oil or castor oil, especially in their polyoxyethylated versions. These oil solutions or suspensions may also contain a long-chain alcohol diluent or dispersant, such as Ph. Helv or similar alcohol.

Solutions or suspensions used for parenteral, intradermal, subcutaneous, or topical application can include the following components: a sterile diluent such as water for injection, saline solution, fixed oils, polyethylene glycols, glycerine, propylene glycol or other synthetic solvents; antibacterial agents such as benzyl alcohol or methyl parabens; antioxidants such as ascorbic acid or sodium bisulfite; chelating agents such as ethylenediaminetetraacetic acid; buffers such as acetates, citrates or phosphates and agents for the adjustment of tonicity such as sodium chloride or dextrose. The parental preparation can be enclosed in ampoules, disposable syringes or multiple dose vials made of glass or plastic. If administered intravenously, exemplary carriers are physiological saline or phosphate buffered saline (PBS).

The compositions as described herein may be orally administered in any orally acceptable dosage form including, but not limited to, capsules, tablets, aqueous suspensions or solutions. In the case of tablets for oral use, carriers which are commonly used include lactose and corn starch. Lubricating agents, such as magnesium stearate, are also typically added. For oral administration in a capsule form, useful diluents include lactose and dried corn starch. When aqueous suspensions are required for oral use, the active ingredient is combined with emulsifying and suspending agents. If desired, certain sweetening, flavoring or coloring agents may also be added.

Oral compositions will generally include an inert diluent or an edible carrier. They may be enclosed in gelatin capsules or compressed into tablets. For the purpose of oral therapeutic administration, the active compound or its prodrug derivative can be incorporated with excipients and used in the form of tablets, troches, or capsules. Compatible binding agents, and/or adjuvant materials can be included as part of the composition.

The tablets, pills, capsules, troches and the like can contain any of the following ingredients, or compounds of a similar nature: a binder such as microcrystalline cellulose, gum tragacanth or gelatin; an excipient such as starch or lactose, a dispersing agent such as alginic acid, Primogel, or corn starch; a lubricant such as magnesium stearate or Sterotes; a glidant such as colloidal silicon dioxide; a sweetening agent such as sucrose or saccharin; or a flavoring agent such as peppermint, methyl salicylate, or orange flavoring. When the dosage unit form is a capsule, it can contain, in addition to material of the above type, a liquid carrier such as a fatty oil. In addition, dosage unit forms can contain various other materials which modify the physical form of the dosage unit, for example, coatings of sugar, shellac, or enteric agents.

Alternatively, the compositions as described herein may be administered in the form of suppositories for rectal administration. These can be prepared by mixing the agent with a suitable non-irritating excipient, which is solid at room temperature but liquid at rectal temperature and therefore will melt in the rectum to release the drug. Such materials include cocoa butter, beeswax and polyethylene glycols.

The compositions as described herein may also be administered topically. Suitable topical formulations are readily prepared for each of these areas or organs. Topical application for the lower intestinal tract can be effected in a rectal suppository formulation (see above) or in a suitable enema formulation. Topically-acceptable transdermal patches may also be used.

For topical applications, the compositions may be formulated in a suitable ointment containing the active component suspended or dissolved in one or more carriers. Carriers for topical administration of the compounds of this disclosure include, but are not limited to, mineral oil, liquid petrolatum, white petrolatum, propylene glycol, polyoxyethylene, polyoxypropylene compound, emulsifying wax and water. In certain aspects of the disclosure, the compounds may be coated onto an implantable medical device, e.g. a stent which is to be surgically implanted into a patient in order to inhibit or reduce the likelihood of occlusion occurring in the stent in the patient. Other embodiments include a catheter or a catheter coating. Other exemplary implantable devices that can be coated with the polycannabinoids include orthopedic implants, interocular lenses, and the like where the antioxidant and antimicrobial properties of the cannabinoid units provide added benefit.

Alternatively, the compositions can be formulated in a suitable lotion or cream containing the active components suspended or dissolved in one or more pharmaceutically or cosmetically acceptable carriers. Suitable carriers include, but are not limited to, mineral oil, sorbitan monostearate, polysorbate 60, cetyl esters wax, cetearyl alcohol, 2-octyldodecanol, benzyl alcohol and water.

It may be desirable or necessary to introduce the composition to the patient via a mechanical delivery device. The construction and use of mechanical delivery devices for the delivery of such agents is well known in the art. Direct techniques for, for example, administering a drug directly to the brain usually involve placement of a drug delivery catheter into the patient's ventricular system to bypass the blood-brain barrier. One such implantable delivery system, used for the transport of agents to specific anatomical regions of the body, is described in U.S. Pat. No. 5,011,472, issued Apr. 30, 1991.

The compositions can also contain other conventional acceptable compounding ingredients, generally referred to as carriers or diluents, as necessary or desired. Conventional procedures for preparing such compositions in appropriate dosage forms can be utilized. Such ingredients and procedures include those described in the following references, each of which is incorporated herein by reference: Powell, M. F. et al, "Compendium of Excipients for Parenteral Formulations" *PDA Journal of Pharmaceutical Science & Technology* 1998, 52(5), 238-311; Strickley, R. G "Parenteral Formulations of Small Molecule Therapeutics Marketed in the United States (1999)-Part-1" *PDA Journal of Pharmaceutical Science & Technology* 1999, 53(6), 324-349; and Nema, S. et al, "Excipients and Their Use in Injectable Products" *PDA Journal of Pharmaceutical Science & Technology* 1997, 51(4), 166-171.

For ophthalmic use, the compositions may be formulated as micronized suspensions in isotonic, pH adjusted sterile saline, or, as solutions in isotonic, pH adjusted sterile saline, either with our without a preservative such as benzylalkonium chloride. Alternatively, for ophthalmic uses, the compositions may be formulated in an ointment such as petrolatum.

The compositions as described herein may also be administered by nasal aerosol or inhalation. Such compositions are prepared according to techniques well-known in the art of compound formulation and may be prepared as solutions in saline, employing benzyl alcohol or other suitable preservatives, absorption promoters to enhance bioavailability, fluorocarbons, and/or other conventional solubilizing or dispersing agents.

The amount of compound in a composition as described herein that may be combined with the carrier materials to produce a single dosage form will vary depending upon the cannabinoid, the host and the disease treated, the particular mode of administration. The compositions can be formulated to contain between about 0.05 milligram to about 750 milligrams or more, more preferably about 1 milligram to about 600 milligrams, and even more preferably about 10 milligrams to about 500 milligrams of active ingredient, alone or in combination with at least one other compound according to the present disclosure. A particular advantage of the cannabinoid polymers described herein is the ability to prepare and administer accurate concentrations of a cannabinoid due to the polymer's stability against thermal degradation and stability against unwanted conversion of the target cannabinoid to other cannabinoid compounds.

It should also be understood that a specific dosage and treatment regimen for any particular patient will depend upon a variety of factors, including the activity of the specific compound employed, the age, body weight, general health, sex, diet, time of administration, rate of excretion, drug combination, and the judgment of the treating physician and the severity of the particular disease or condition being treated.

Patches, Bandages, Films and Nonwoven Fabrics

In another aspect, a film comprises the cannabinoid polymer(s).

In another aspect, a nonwoven fabric comprises fibers comprising the cannabinoid polymer(s).

In certain embodiments, the films or nonwoven fabrics comprising the cannabinoid polymers described herein can be used in the fabrication of patches for transdermal delivery, bandages, wound dressing, sutures or for other topical or sublingual applications.

In certain embodiments, the films or fibers are formed by melt processing of the cannabinoid polymers.

Transdermal patches and wound dressings may be used to provide continuous or discontinuous infusion of the polymers and compounds in controlled amounts. In general, construction and use of transdermal patches for the delivery of agents is well known in the art (see, e.g., U.S. Pat. No. 5,023,252, issued Jun. 11, 1991, incorporated herein by reference). Such patches may be constructed for continuous, pulsatile, or on demand delivery of such agents. In one aspect, a patch is made from the cannabinoid polymer(s).

Transdermal patches and wound dressings may be a film or a sheet formed using the polymer. In certain embodiments, the film or the sheet of the polymer is further physically or chemically crosslinked or additional layers or sheets including, but not limited to, adhesive layers, protective layers, release layers, backing layers, and the like.

The transdermal patches and wound dressings, particularly in film-form or sheet-form, may or may not be porous.

The thickness of the film-form or sheet-form transdermal patches or wound dressings is at least 10 μm, from 75 to 5,000 μm, from 100 to 2,000 μm, or from 200 to 1,000 μm.

The transdermal patches and wound dressings can be formed into a sheet form by extrusion molding. Any conventional methods such as inflation molding, T-die molding, lamination molding, etc., can be used as the extrusion molding, and since a high-temperature extrusion and quick cooling are applicable, the film or sheet of the polymer having an excellent optical property can be obtained. Furthermore, from the standpoints that the production speed can be increased due to the good cooling efficiency and the thickness of the sheet formed can be easily controlled, T-die molding can be employed. In addition, a single screw extruder or a twin screw extruder can be used as the extruder.

By properly controlling the molding conditions such as the molding temperature, the die lip width, the extrusion speed, the drawing speed, etc., the thickness of the film or sheet can be controlled.

Any conventional methods such as a calender method, a casting method, an extrusion method, etc., can be used as the film-forming method of the film or the sheet of the polymer described herein. The film or the sheet-thus obtained is cut into a desired form and can be used as a patch or wound dressing.

A mesh or porous film or sheet can be obtained by punching the film or sheet with a mold or by molding in a casting method with a mesh-form mold. Also, a porous dressing can be obtained by swelling the film or the sheet by absorbing water and then dry freezing the swelled film or sheet. A mesh or porous sheet has a gas permeability factor which can be controlled for the particular application.

In certain embodiments, the patch or wound dressing may have a backing material or backing layer to improve the strength, the fixing property, the form-retention property, the adhesive property, etc.

In this case, the size of the backing material is same as or larger than the size of each dressing of each form. Any conventional materials can be used as the material of the backing material. Specific examples of the material for the backing material are papers, nonwoven fabrics, cotton fabrics, synthetic resin fabrics, synthetic resin films, synthetic resin foams, mesh-form or network papers, nonwoven fabrics, cotton fabrics, synthetic resin fabrics, or synthetic resin films, and the surgical tapes, the medical pressure-sensitive adhesive sheets, pressure-sensitive adhesive dressings, etc., using the above films or sheets as a substrate. Of those, the materials having excellent gas permeability and moisture permeability are more preferred.

Similarly, in certain embodiments, the patch or wound dressing may have an adhesive material or layer, with or without a release layer. Any conventional materials can be used as the material of the adhesive layer.

Therapeutic Methods

In an additional aspect, the description provides therapeutic compositions comprising an effective amount of a cannabinoid polymers as described herein or salt form thereof, and a pharmaceutically or cosmetically acceptable carrier. Cannabinoids have known antioxidant and antimicrobial properties that are expected to be found in the polycannabinoids described herein.

The terms "treat", "treating", and "treatment", etc., as used herein, refer to any action providing a benefit to a patient for which the present compounds may be administered, including the treatment of any disease state or condition which is modulated through the protein to which the present compounds bind. Disease states or conditions, including cancer, which may be treated using compounds according to the present disclosure are set forth hereinabove.

In certain embodiments, the method comprises administering an effective amount of a cannabinoid polymers as described herein, optionally including a pharmaceutically or cosmetically acceptable excipient, carrier, adjuvant, another bioactive agent or combination thereof.

In additional embodiments, the description provides methods for treating or ameliorating a disease, disorder or symptom thereof in a subject or a patient, e.g., an animal such as a human, comprising administering to a subject in need thereof a composition comprising an effective amount, e.g., a therapeutically effective amount, of a compound as described herein or salt form thereof, and a pharmaceutically or cosmetically acceptable excipient, carrier, adjuvant, another bioactive agent or combination thereof, wherein the composition is effective for treating or ameliorating the disease or disorder or symptom thereof in the subject.

In another embodiment, the present disclosure is directed to a method of treating a human patient in need thereof to produce a therapeutic effect in the patient, the method comprising administering to a patient in need an effective amount of a cannabinoid polymers according to the present disclosure, optionally in combination with another bioactive agent. The disease state or condition may be a disease caused by a microbial agent or other exogenous agent such as a virus, bacteria, fungus, protozoa or other microbe or may be a disease state, which is caused by overexpression of a protein, which leads to a disease state and/or condition.

Disease states or conditions which may be treated using cannabinoid polymers according to the present disclosure include, for example, asthma, autoimmune diseases such as multiple sclerosis, various cancers, ciliopathies, cleft palate, diabetes, heart disease, hypertension, inflammatory bowel disease, mental retardation, mood disorder, obesity, refractive error, infertility, Angelman syndrome, Canavan disease, Coeliac disease, Charcot-Marie-Tooth disease, Cystic fibrosis, Duchenne muscular dystrophy, Haemochromatosis, Haemophilia, Klinefelter's syndrome, Neurofibromatosis, Phenylketonuria, Polycystic kidney disease, (PKD1) or 4 (PKD2) Prader-Willi syndrome, Sickle-cell disease, Tay-Sachs disease, Turner syndrome.

The term "bioactive agent" is used to describe an agent, other than a cannabinoid polymers according to the present disclosure, which is used in combination with the present compounds as an agent with biological activity to assist in effecting an intended therapy, inhibition and/or prevention/prophylaxis for which the present compounds are used. Preferred bioactive agents for use herein include those agents which have pharmacological activity similar to that for which the present compounds are used or administered and include for example, anticancer agents, antiviral agents, especially including anti-HIV agents and anti-HCV agents, antimicrobial agents, antifungal agents, etc.

The term "pharmaceutically acceptable salt" is used throughout the specification to describe, where applicable, a salt form of one or more of the cannabinoid polymers described herein which are presented to increase the solubility of the compound in the gastric juices of the patient's gastrointestinal tract in order to promote dissolution and the bioavailability of the compounds. Pharmaceutically acceptable salts include those derived from pharmaceutically acceptable inorganic or organic bases and acids, where applicable. Suitable salts include those derived from alkali metals such as potassium and sodium, alkaline earth metals such as calcium, magnesium and ammonium salts, among numerous other acids and bases well known in the pharmaceutical art. Sodium and potassium salts are particularly preferred as neutralization salts of the phosphates according to the present disclosure.

The term "pharmaceutically acceptable derivative" is used throughout the specification to describe any pharmaceutically acceptable prodrug form (such as an ester, amide other prodrug group), which, upon administration to a patient, provides directly or indirectly the present compound or an active metabolite of the present compound.

Additional Uses

In another aspect, the cannabinoid polymers described herein can be used as a biodegradable, compostable, and/or recyclable polymer for the preparation of commodity items. These polymers can be processed using techniques and methods known in the art, e.g., those known for processing polyester polymers.

EXAMPLES

In order to provide a better understanding of the foregoing disclosure, the following non-limiting examples are offered. Although the examples may be directed to specific embodiments, they are not to be viewed as limiting in any specific respect.

Materials and Methods: Cannabidiol (CBD) was purchased from EcoGen BioSciences and used as received. Cannabigerol (CBG) was purchased from Mile High Labs, Inc and used as received. All other chemicals were purchased from Sigma Aldrich and used without further purification unless otherwise noted. Unless otherwise indicated, $^1$H NMR was collected using a Bruker AVANCE 500 MHz instrument. Thermo Gravimetric Analysis was conducted using a TA Instruments TGA Q-500 and DSC was collected using a TA Instruments DSC Q-20. GPC was taken using a WATERS GPC equipped with a 1515 HPLC Pump and Waters 717Plus Autoinjector. Ultra Performance Liquid Chromatograph tandem Mass Spectrometry (UPLC/MS/MS) was conducted using a Waters Acquity UPLC-TQD equipped with a PDA detector.

Example 1—Preparation of Sebacoyl Chloride: To a flame dried 25 mL round bottom flask was added 5 grams (24.7 mmol) of sebacic acid and 10 mL (137.8 mmol) of thionyl chloride. A reflux condenser was added to the flask and the solution allowed to stir at 90° Celsius for 3 hours until all the solid acid had dissolved. After cooling to room temperature, excess thionyl chloride was removed under vacuum. Five mL of anhydrous toluene was added and removed under vacuum to further remove excess thionyl chloride. The clear yellow solution was further purified by vacuum distillation to yield a colorless oil (5 grams, yield 84.6%).

Example 2A—Preparation of Cannabidiol Polyester—poly(Cannabidiol-Sebacate): To a flame dried 25 mL three-neck round bottom flask, containing a solution of 10 mL anhydrous DCM and 5 mL of anhydrous Pyridine, 1 gram (3.2 mmol) of dry CBD was dissolved. Next, 0.68 mL of freshly made and distilled sebacoyl chloride (3.2 mmol) was added dropwise at room temperature over 10 minutes and the reaction allowed to stir at room temperature for 96 hours. The viscous solution was precipitated using dry-ice cold methanol. The solid was collected by filtering and dried under vacuum for 2 days to give 1.3 grams of white polymer; yield 81%. $^1$H NMR (400 MHz, CDCl$_3$): δ 6.68 (s, 2H), 5.20 (s, 1H), 4.54 (s, 1H), 4.46 (s, 1H), 3.51-3.45 (m, 1H), 2.69-2.27 (m, 7H), 2.20-1.97 (m, 2H), 1.89-1.47 (m, 16H), 1.46-1.40 (m, 12H), 0.87 (t, 3H).

Example 2B—Preparation of Cannabidiol Polyester—poly(Cannabidiol-Sebacate): 20 mL of anhydrous methylene chloride (DCM) and 10 mL of anhydrous pyridine were added to a flame-dried 50 mL two-neck round bottom flask. 1.0 gram (0.00318 mol) of cannabidiol (CBD) was added to the solution and allowed to dissolve while stirring. The solution was then chilled to 0° C. in an ice-water bath. 0.68 mL (0.00318 mol) of Sebacoyl Chloride was then added dropwise over 30 minutes and the reaction stirred for 4 days. After some time, the solution turned from cloudy white to a transparent light-yellow. After the reaction finished, it was concentrated and precipitated in cold methanol to give white polymer strands (1.52 g, 86% yield). Mn 28 k, PDI 1.52. $^1$H NMR (500 MHz, CDCl3): δ (ppm): 6.68 (s, 2H), 5.19 (s, 1H), 4.54 (s, 1H), 4.46 (s, 1H), 3.48 (s, 1H), 2.64 (t, 1H), 2.55-2.32 (m, 6H), 2.13 (m, 1H), 2.03-1.99 (m, 1H), 1.81-1.56 (m, 13H), 1.45-1.22 (m, 13H), 0.81 (t, 3H).

Example 3—Preparation of Cannabidiol Polyurethane: To a flame dried three-neck round bottom flask was added 1 gram (3.2 mmol) of dry CBD and 20 mL of anhydrous DCM. Next, 0.456 mL (3.2 mmol) of TDI (tolylene-2,4-diisocyanate) is added to the solution and stirred for 15 minutes. After stirring, 1 mL of a stock solution of DMAP in anhydrous DCM (2 mg/mL) was added to the flask. A reflux condenser was attached to the flask and the solution refluxed for 24 hours. After the reaction finished, the solution was quenched with dry-ice cold methanol. The solid was collected by filtering and dried under vacuum for 2 days to give 1.42 grams of white polymer; yield 84%.

Example 4—Preparation of Cannabidiol Polyester—poly(Cannabidiol-Adipate): 80 mL of anhydrous methylene chloride (DCM) and 40 mL of anhydrous pyridine were added to a dried 250 mL two-neck round bottom flask. 10 grams (0.0318 mol) of cannabidiol (CBD) was added to the solution and allowed to dissolve while stirring. The solution was then chilled to 0° C. in an ice-water bath. 4.66 mL (0.0318 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (12.15 g, 90% yield). Mn 21 k, PDI 1.63. $^1$H NMR (500 MHz, CDCl3): δ (ppm): 6.75 (s, 2H), 5.25 (s, 1H), 4.59 (s, 1H), 4.51 (s, 1H), 3.54 (d, 1H), 2.58 (m, 7H), 2.18 (m, 1H), 2.09 (m, 1H), 1.86-1.63 (m, 14H), 1.35 (m, 4H), 0.92 (t, 3H).

Example 5—Preparation of Cannabigerol Polyester—Preparation of poly(Cannabigerol-Adipate): 80 mL of anhydrous methylene chloride (DCM) and 40 mL of anhydrous pyridine were added to a dried 250 mL two-neck round bottom flask. 10 grams (0.0316 mol) of cannabigerol (CBG) was added to the solution and allowed to dissolve while stirring. The solution was then chilled to 0° C. in an ice-water bath. 4.62 mL (0.0316 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (11.73 g, 87.6% yield). Mn 21 k, PDI 1.61. $^1$H NMR (500 MHz, CDCl3): δ (ppm): 6.82 (s, 2H), 5.07 (m, 2H), 3.17 (m, 2H), 2.68-2.50 (m 6H), 2.07 (m, 2H), 1.99 (m, 2H) 1.90 (m, 4H), 1.77-1.57 (m, 11H), 1.36 (m, 4H), 0.93 (t, 3H).

Example 6—Preparation of Cannabigerol Polyester—poly(Cannabigerol-Sebacate): 20 mL of anhydrous methylene chloride (DCM) and 10 mL of anhydrous pyridine were added to a dried 50 mL two-neck round bottom flask. 1.0 grams (0.0316 mol) of cannabigerol (CBG) was added to the solution and allowed to dissolve while stirring. The solution was then chilled to 0° C. in an ice-water bath. 0.67 mL (0.0316 mol) of Sebacoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (1.47 g, 83.4% yield). $^1$H NMR (500 MHz, CDCl3): δ (ppm): 6.75 (s, 2H), 5.07-5.01 (m, 2H), 3.12 (d, 2H), 2.59-2.48 (m, 6H), 2.02 (m, 2H), 1.93 (m, 2H), 1.77-1.69 (m, 4H), 1.68-1.57 (m, 10H), 1.44-1.25 (m, 13H), 0.88 (t, 3H).

Example 7—Preparation of Co-Polyester—Preparation of poly(Cannabidiol-co-Cannabigerol-Adipate): 20 mL of anhydrous chloroform (CHCl$_3$) and 10 mL of anhydrous pyridine were added to a flame-dried 50 mL two-neck round bottom flask. 1.258 grams (0.00398 mol) of cannabigerol (CBG) and 1.25 grams (0.00398 mols) of cannabidiol (CBD) was added to the solution and allowed to dissolve while stirring. The solution was then chilled to 0° C. in an ice-water bath. 1.165 mL (0.00795 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (3.5 g, 88%. 3 yield). $^1$H NMR (500 MHz, CDCl3): δ (ppm): 6.77 (s, 2H), 6.70 (s, 2H), 5.20 (s, 1H), 5.04 (m, 2H), 4.55 (s, 1H), 4.46 (s, 1H), 3.52-3.43 (m, 1H), 3.12 (d, 2H), 2.66-2.38 (m, 13H), 2.19-2.07 (m, 2H), 2.06-1.98 (m, 3H), 1.89-1.71 (m, 10H), 1.69 (s, 3H), 1.65 (s, 6H), 1.62-1.52 (m, 9H), 1.35-1.23 (m, 8H), 0.92-0.81 (m, 6H).

Example 8—Preparation of Co-Polyester—Preparation of poly(Cannabidiol-co-Olivetol-Adipate): 20 mL of anhydrous chloroform (CHCl$_3$) and 10 mL of anhydrous pyridine were added to a flame-dried 50 mL two-neck round bottom flask. 1.25 grams (0.00398 mols) of cannabidiol (CBD) was added to the solution and allowed to dissolve while stirring. The solution was then chilled to 0° C. in an ice-water bath. 1.165 mL (0.00795 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give brown polymer strands (3.5 g, 88%. 3 yield). $^1$H NMR (500 MHz, CDCl3): δ (ppm): 6.80 (s, 2H), 6.74 (m, 1H), 6.70 (s, 2H), 5.20 (s, 1H), 4.55 (s, 1H), 4.46 (s, 1H), 2.79-2.35 (m, 14H), 2.19-2.07 (m, 1H), 2.06-1.96 (m, 1H), 1.90-1.49 (m, 20H), 1.37-1.24 (m, 8H), 0.92-0.82 (m, 6H).

Example 9—Preparation of Cannabidiol Polyester—poly(Cannabidiol-Terephthalate): 10 mL of anhydrous methylene chloride (DCM) and 10 mL of anhydrous pyridine were added to a flame-dried 50 mL two-neck round bottom flask. 1.0 grams (0.00318 mols) of cannabidiol (CBD) was added to the solution and allowed to dissolve while stirring. The solution was then chilled to 0° C. in an ice-water bath. Terephthaloyl Chloride (0.6456 grams, 0.00318 mols), dissolved in 10 mL of anhydrous DCM, was then added dropwise over 30 minutes and the reaction stirred for 4 days. After the reaction was finished, it was precipitated in cold methanol to give a white, flakey solid (1.45 grams, 88.1% yield).

Example 10—Preparation of Cannabigerol Polyester—poly(Cannabigerol-Terephthalate): 10 mL of anhydrous methylene chloride (DCM) and 10 mL of anhydrous pyridine were added to a flame-dried 50 mL two-neck round bottom flask. 1.006 grams (0.00318 mols) of cannabigerol (CBG) was added to the solution and allowed to dissolve while stirring. The solution was then chilled to 0° C. in an ice-water bath. Terephthaloyl Chloride (0.6456 grams, 0.00318 mols), dissolved in 10 mL of anhydrous DCM, was then added dropwise over 30 minutes and the reaction stirred for 4 days. After the reaction was finished, it was precipitated in cold methanol to give a white, flakey solid (1.36 grams, 82.4% yield).

Example 11—Preparation of Cannabidiol-Diacetate: 50 mL of anhydrous methylene chloride (DCM) and 6 mL of freshly distilled triethylamine (TEA) was added to a flame dried 100 mL two-neck round bottom flask. 5 grams (15.9 mmol) of cannabidiol (CBD) was added to the solution and dissolved while stirring. The solution was then chilled to 0° C. in an ice-water bath. Excess acetyl chloride (3.0 mL, 42 mmol) was added to the solution dropwise over 15 minutes. The reaction turned white, cloudy after addition of the acetyl chloride. After several hours, the solution became clear orange and was stirred for an additional 96 hours. After the reaction finished, the solvent was stripped using rotary evaporation, leaving crude orange oil. The oil was then redissolved in ethyl acetate, which precipitated protonated TEA salts. The mixture was filtered, and the liquid was washed with water (3×20 mL) and brine (3×20 mL). The aqueous washings were extracted with ethyl acetate (2×20 mL). Organic fractions were collected dried and concentrated using rotary evaporation to yield a viscous light-yellow oil. The oil was further purified using column chromatography using a 1:9 ratio of ethyl acetate to hexane. The product was concentrated using rotary evaporation and left to dry on a vacuum line overnight to give a viscous, colorless oil (5.97 g, 94% yield). 1H NMR (500 MHz, CDCl3): δ (ppm): 6.71 (s, 2H), 5.19 (s, 1H), 4.55 (s, 1H), 4.45 (s, 1H), 3.50 (d, 1H), 2.65 (td, 1H), 2.54 (t, 2H), 2.19 (m, 7H), 2.04-2.01 (d, 1H), 1.83-1.69 (m, 2H), 1.67 (s, 3H), 1.63-1.53 (m, 5H), 1.30 (m, 4H), 0.88 (t, 3H).

Example 12—Preparation of Cannabigerol-Diacetate: 50 mL of anhydrous methylene chloride (DCM) and 6 mL of freshly distilled triethylamine (TEA) was added to a flame dried 100 mL two-neck round bottom flask. 5 grams (15.79 mmol) of cannabigerol (CBG) was added to the solution and dissolved while stirring. The solution was then chilled to 0° C. in an ice-water bath. Excess acetyl chloride (3.0 mL, 42 mmol) was added to the solution dropwise over 15 minutes. The reaction turned white, cloudy after addition of the acetyl chloride. After several hours, the solution became clear orange and was stirred for an additional 96 hours. After the reaction finished, the solvent was stripped using rotary evaporation, leaving crude orange oil. The oil was then redissolved in ethyl acetate, which precipitated protonated TEA salts. The mixture was filtered, and the liquid was washed with water (3×20 mL) and brine (3×20 mL). The aqueous washings were extracted with ethyl acetate (2×20 mL). Organic fractions were collected dried and concentrated using rotary evaporation to yield a viscous light-yellow oil. The oil was further purified using column chromatography using a 1:9 ratio of ethyl acetate to hexane. The product was concentrated using rotary evaporation and left to dry on a vacuum line overnight to give a viscous, colorless oil (5.74 g, 91% yield). 1H NMR (500 MHz, CDCl3): δ (ppm): 6.77 (s, 2H), 5.05 (m, 2H), 3.15 (d, 2H), 2.56 (t, 2H), 2.27 (s, 6H), 2.05 (m, 3H), 1.95 (m, 2H), 1.71 (s, 3H), 1.65 (s, 3H), 1.60 (m, 4H), 1.31 (m, 4H), 0.88 (t, 3H).

Example 13—Preparation of poly(CBD-Adipate) films: 18 wt. % of CBD in 1,4 Dioxane solution was prepared by using Thinky Planetary Centrifugal Mixer (rotation+revolution) for improved dissolution, uniformity, and degassing. Films were cast on glass substrate having a smooth surface, by using a motorized drawdown coater. The doctor blade was set to an initial casting thickness of 203 μm.

Example 14—Comparison of poly(cannabinoid-adipate) and cannabinoid-diacetate: To distinguish property changes caused by polymerization from those caused by changes in functionality, CBD and CBG were reacted with acetyl chloride to create diacetate derivatives Examples 11-12, respectively. These model compounds were subjected to the same analysis and characterization as the poly(cannabinoid)s poly(CBD-adipate) and poly(CBG-adipate) of Examples 4-5, respectively for direct comparison. CBD and CBG were reacted with adipoyl chloride for four days in the presence of pyridine to produce white polymers of ca. 21 k molecular weight with glass transition temperatures (Tg) ca. 40° C. and −30° C., respectively.

Figure 2:
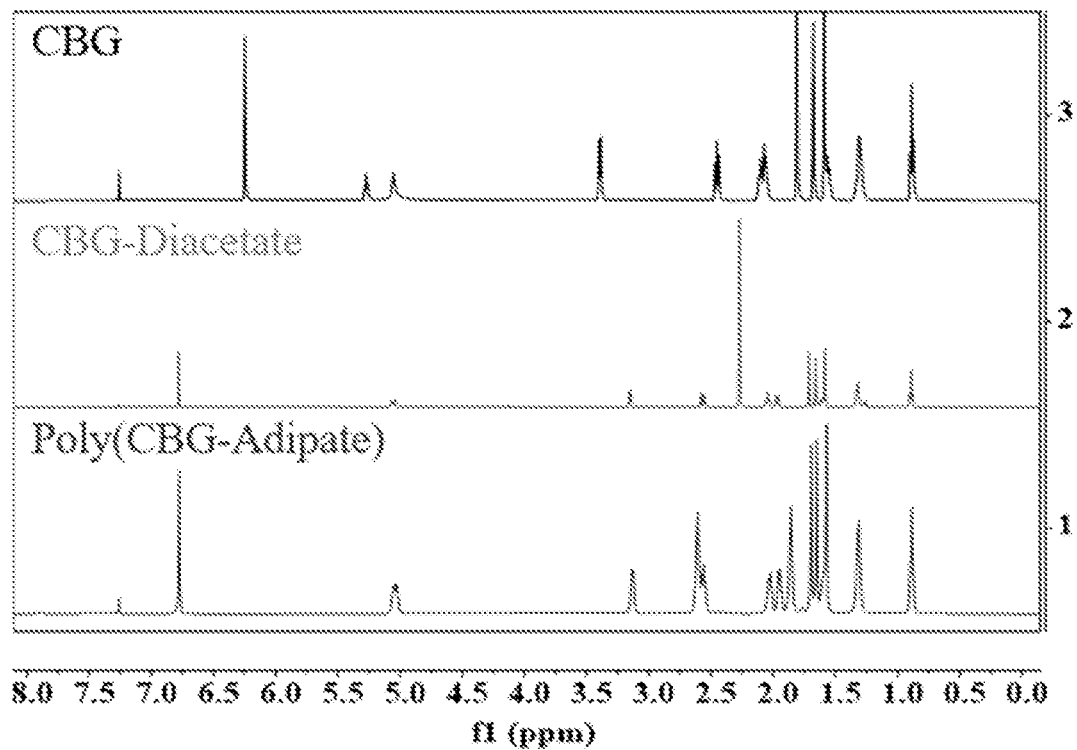
FIG. 2 shows the results of proton NMR of CBG, CBG-diacetate, and poly(CBG-adipate) polyester in deuterated chloroform. The CBG hydroxy peaks (ca. 6.2 ppm) are missing from both the polyester and the diacetate spectra.

¹H-NMR spectroscopy shows successful synthesis of both the model compounds and the cannabinoid polyesters for CBD and CBG (FIGS. 1-2). This is indicated by the disappearance of the hydroxy peaks of CBD and CBG, and the downfield shift of the aromatic hydrogens caused by the conversion from phenol groups to less electron donating ester functionalities. An interesting observation between the NMR spectra of CBD and CBG are the multiple and broad signals of the aromatic hydrogens of CBD that are not present in CBG. This splitting has been shown to be temperature dependent, appearing as a singlet above 25° C. and is attributed to a restricted rotation of the limonene portion of CBD caused by intermolecular hydrogen bonding between phenol groups.

Thermogravimetric Analysis (TGA): Non-Isothermal degradation: Samples were heated in pre-tared platinum pans under nitrogen atmosphere to 700° C. at a heating rate of 10° C./minute.

Isothermal degradation: Samples were heated in pre-tared pans while in the presence of oxygen to either 150, 160, 180 or 220° C. at a heating rate of 10° C./minute. They were left at the high temperature for 60 minutes. The degradation rate was determined from the slope of the weight % vs Time plots.

Figure 3:
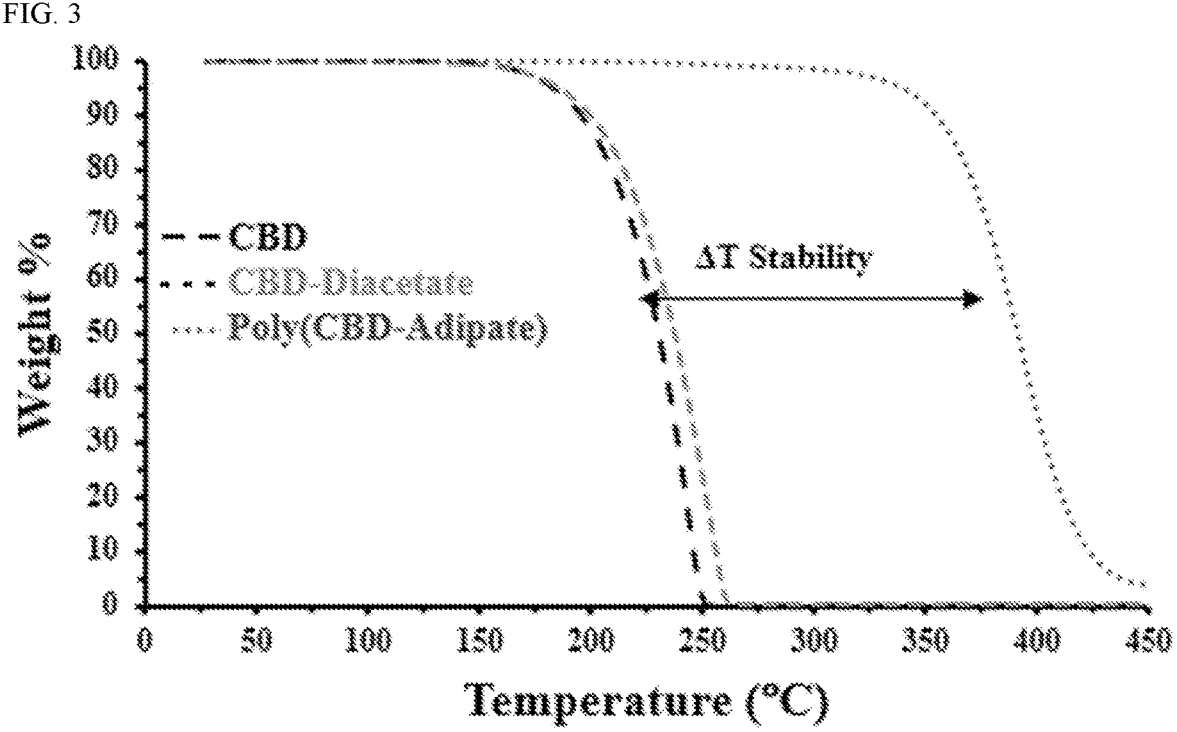
FIG. 3 shows the results of thermal gravimetric analysis (TGA) of CBD, CBD diacetate derivative, and poly(CBD-adipate) polyester indicating that CBD sequestered by chemical bonds within the backbone of a polyester has better thermal stability than pure chemical, CBD.
Figure 4:
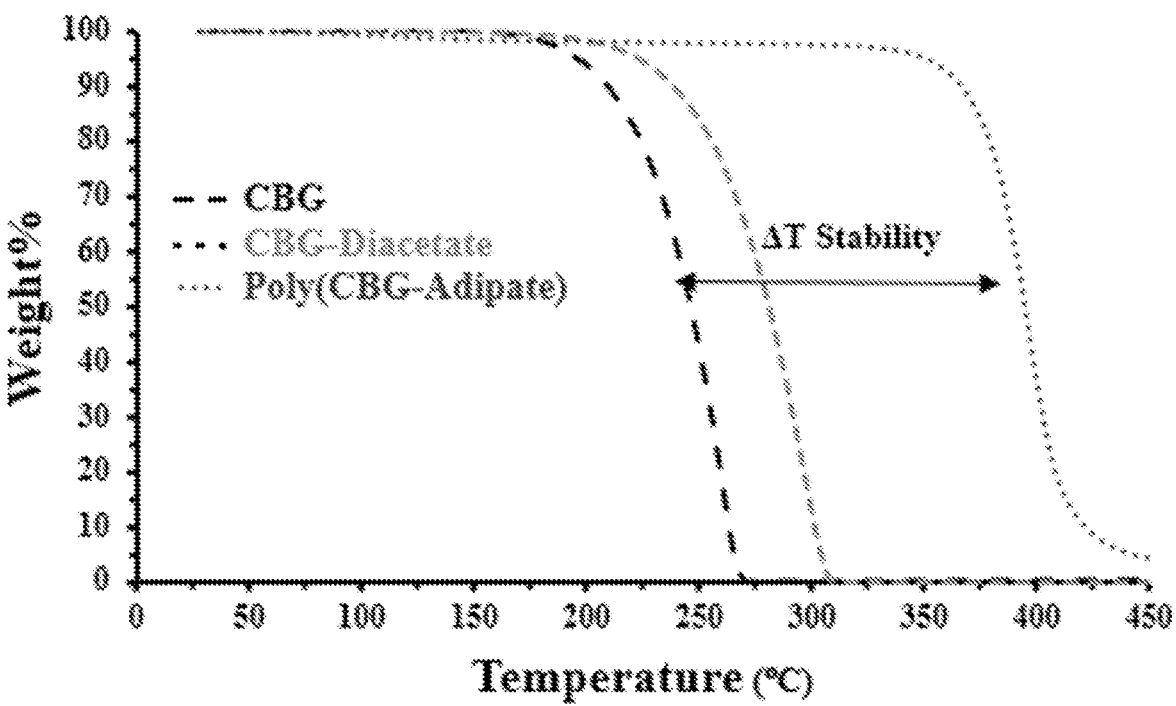
FIG. 4 shows the results of thermogravimetric analysis of CBG, CBG diacetate derivative, and poly(CBG-adipate) polyester indicating that CBG sequestered by chemical bonds within the backbone of a polyester has better thermal stability than pure chemical, CBG.

FIGS. 3-4 show the Thermal Gravimetric Analysis (TGA) of CBD and CBG, their diacetate derivatives, and polyesters synthesized using adipic acid linkers. For both cannabinoids, the extrapolated onset degradation temperature nearly doubled going from 184 to 361° C. for CBD and 191 to 365° C. for CBG in going from the phytocannabinoid to the poly(cannabinoid). In going from CBD to the poly(CBD-adipate), the restricted rotation of the limonene is eliminated as indicated by the singlet observed for the two aromatic hydrogens in the polymer. The increase in degradation temperature after acetylation was 184 to 185° C. for CBD and 191 to 223° for CBG. Not wishing to be bound by theory but, the primary contributor of poor thermal stability in phytocannabinoids cannot be attributed to stability of the phenol hydroxyl functionality. Incorporation of cannabinoids into the backbone of polymer structures offer materials with greatly enhanced thermal stability. Since there is no stability gained in the diacetate of CBD, it can be hypothesized that the increase in limonene rotation about the olivetol also does not contribute to a gain in thermal stability. Yet, in both cases for CBD and CBG, there is substantial gain in thermal stability in making of their polymers.

Differential Scanning calorimetry (DSC): Poly(CBD-Adipate) and poly(CBG-Adipate) were sealed in aluminum pans and heated from −50° C. to 300° C., cooled back to −50° C., and heated back up to 300° C. The heating and cooling rate was 10° C. Scans were run under nitrogen atmosphere.

Heat induced by-product analysis experiment: Open vials containing 100 mg of CBD, CBD-Diacetate, and Poly(CBD) were heated at 175° C. for 30 minutes in a laboratory convection oven. After heating, the remaining residue was weighed at 89.64 mg, 91.35 mg, and 99.86 mg for each compound, respectively. Samples were then analyzed using ¹H NMR. New peaks formed for both the CBD and CBD-Diacetate samples. Ultra performance liquid chromatograph tandem mass spectrometry (UPLC/MS/MS) was conducted to compare formed by-products against nine known cannabinoid standards.

Figure 5:
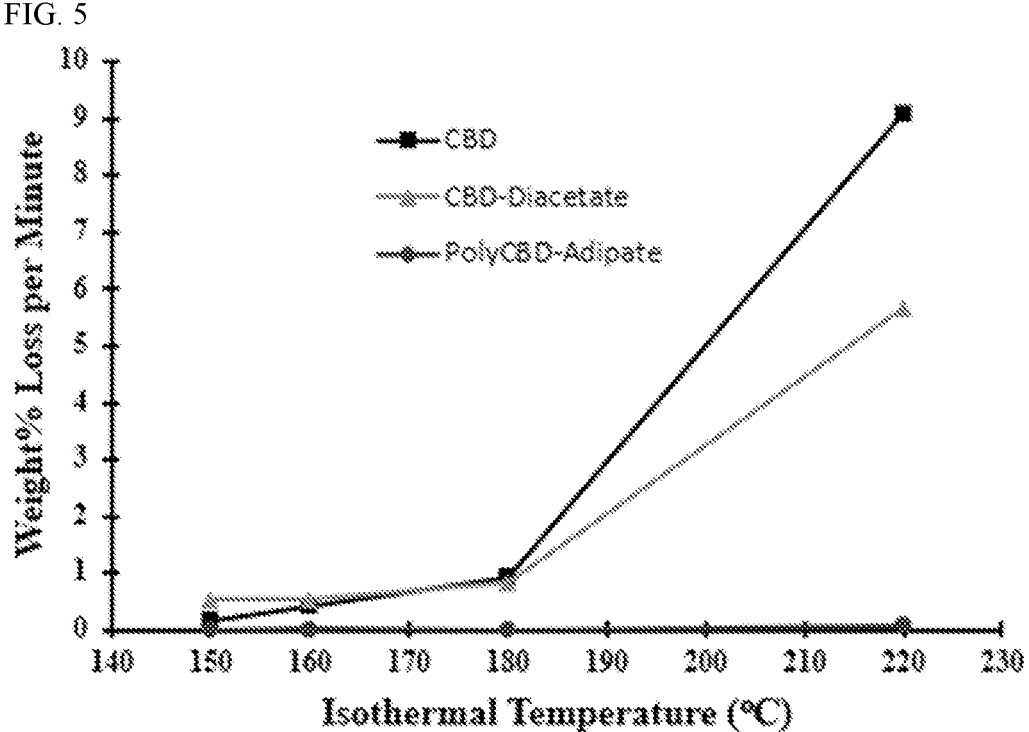
FIG. 5 shows rates of isothermal degradation of CBD, CBD-diacetate, poly(CBD-adipate); isothermal degradation experiments were done using thermogravimetric analysis in the presence of oxygen.
Figure 6:
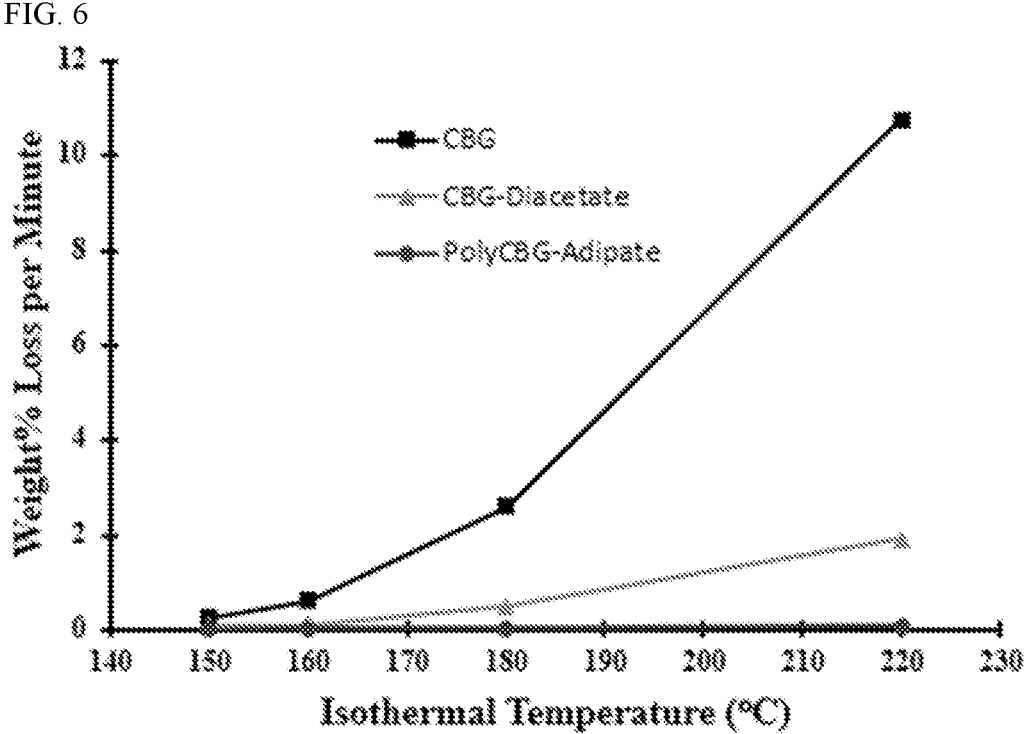
FIG. 6 shows rates of isothermal degradation of CBG, CBG-diacetate, poly(CBG-adipate); isothermal degradation experiments were done using thermogravimetric analysis in the presence of oxygen.

Popular types of consumer cannabis products include tinctures, vaporizer liquids, and baked foods, while potential pharmaceutical products include oil extracts, solutions, and tablet. In each case, cannabinoids within the products are subjected to elevated temperatures for short periods of time during manufacturing or, in the case of vaporizer liquids, when being consumed. FIGS. 5-6 show the rates of degradation after short-term exposure to temperatures from 150-220° C. Table 1 includes the values of onset temperatures for thermal degradation and degradation rates for each compound. The phytocannabinoids degraded at rates from 0.2 wt % per minute to ~10 wt % per minute at 150° C. and 220° C., respectively. Thermal degradation of both poly(cannabinoid)s remained less than 0.1 wt % over the same range, stabilizing the phytocannabinoid. Open vials containing 100 mg samples of CBD, CBD-diacetate, and poly(CBD-adipate) were heated at 175° C. in a laboratory convection oven for 30 minutes, after which 89.64 mg, 91.35, and 99.86 mg remained of each sample, respectfully. NMR analysis of the sample residues showed the formation of additional compounds in both the CBD and CBD-diacetate samples while no additional peaks were observed for poly(CBD-adipate). The heated CBD and CBD-diacetate samples were analyzed using LC/MS, which showed the amount of by-product formation to be 10.68% for CBD and 25.32% for CBD-diacetate. Additionally, when compared against a standard set of known cannabinoids, 2.15% (1.93 mg) of the CBD sample was converted to Δ9-THC while 0.66% (0.59 mg) of the sample was converted to CBN. A small amount of Δ9-THC (0.16%) and Δ8-THC (0.21%) was detected using ¹H NMR in samples heated under the same conditions after purging thoroughly with argon, suggesting the conversion of CBD to Δ9-THC is possible at elevated temperatures even in the absence of carbon dioxide and water. Conversion of phytocannabinoids to poly(cannabinoid)s offers a preservative effect, eliminating the production of additional cannabinoids.

TABLE 1

| Cannabinoid | $T_d$(° C.)[1] | 150(° C.)[2] | 160(° C.)[2] | 180(° C.)[2] | 220(° C.)[2] |
|---|---|---|---|---|---|
| CBD | 184 | 0.18 | 0.43 | 0.94 | 9.09 |
| CBD-Diacetate | 185 | 0.54 | 0.54 | 0.84 | 5.65 |
| Poly(CBD-Adipate) | 361 | 0.01 | 0.02 | 0.01 | 0.08 |
| CBG | 191 | 0.27 | 0.63 | 2.61 | 10.75 |
| CBG-Diacetate | 223 | 0.08 | 0.11 | 0.49 | 1.92 |
| Poly(CBG-Adipate) | 365 | 0.02 | 0.03 | 0.05 | 0.09 |

[1]Onest for thermal degradation according to non-isothermal TGA.
[2]Degradation rate in units of weight % loss per minute from Isothermal TGA.

Figure 7:
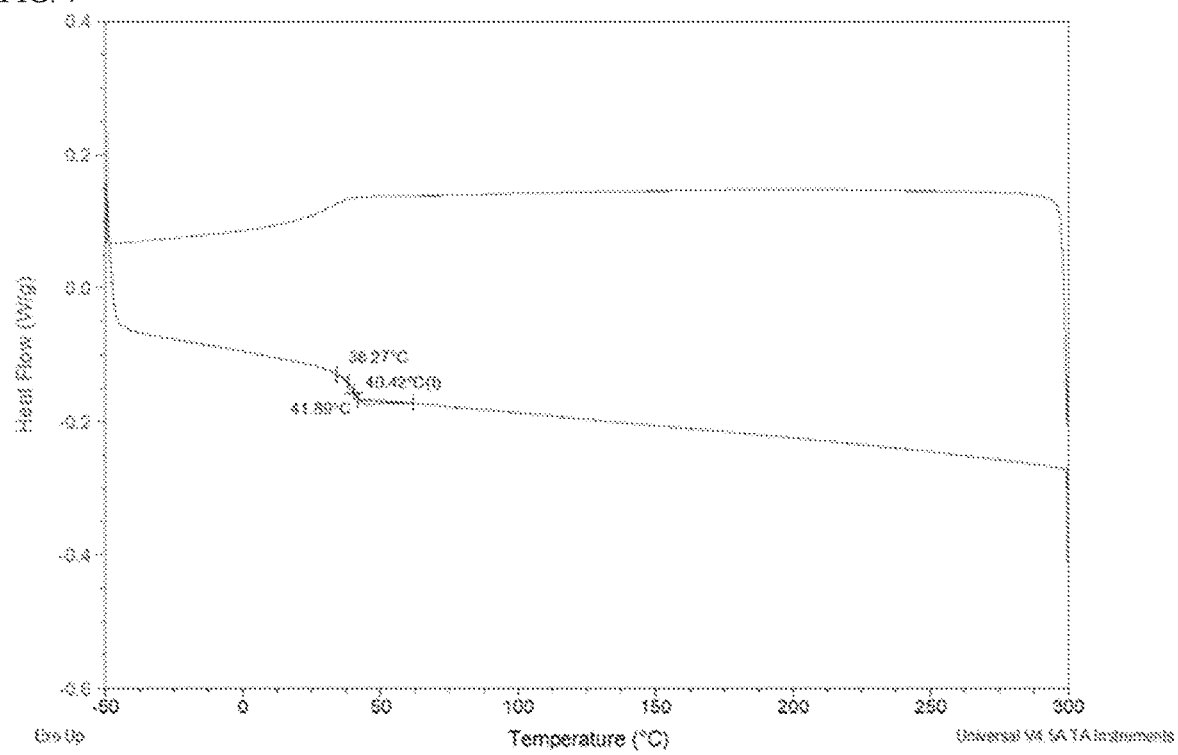
FIG. 7 shows a differential scanning calorimetry (DSC) thermogram of poly(CBD-adipate).
Figure 8:
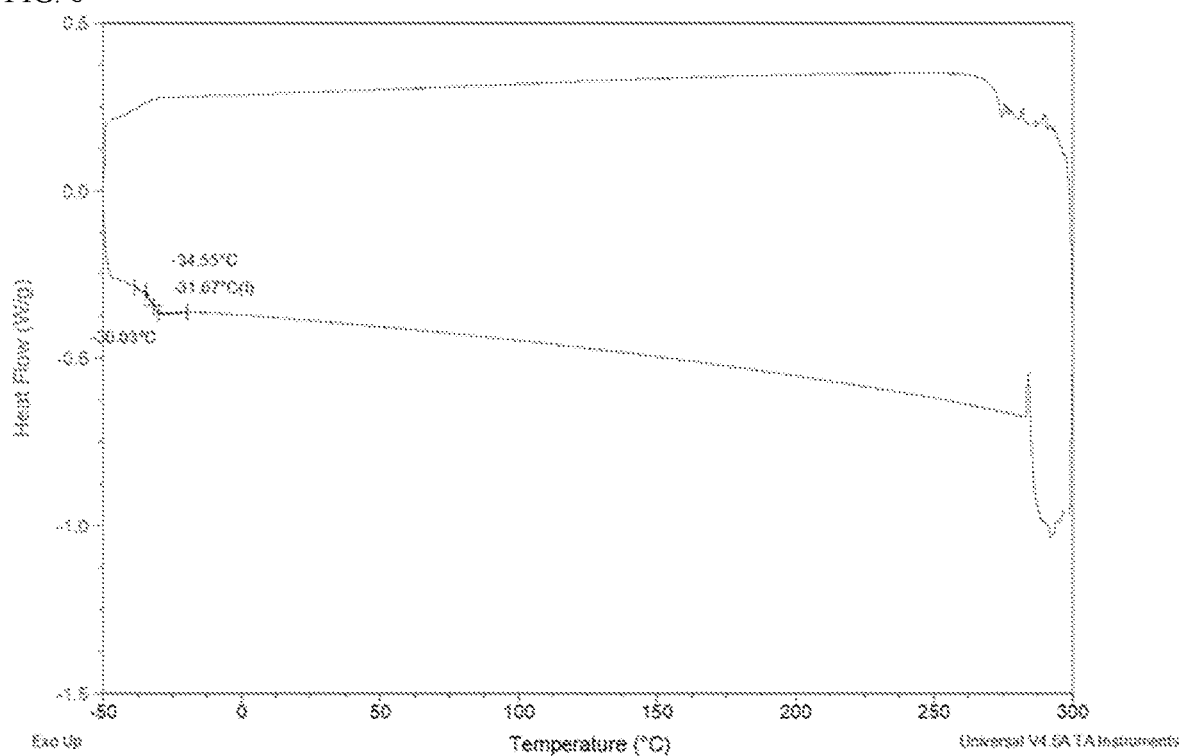
FIG. 8 shows a DSC thermogram of poly(CBG-adipate).

The DSC curves of the films (poly(CBD-adipate FIG. 7 and poly(CBG-adipate FIG. 8) exhibit an exotherm, indicating that this polymer is crystallizable. The poly(CBD-adipate) film was sealed in an aluminum pan and heated to 170° C., held for 40 minutes, cooled to 0° C., and heated back up to 300° C. at 10° C./minute, as is shown in FIG. 7. During the second heating, a broad melting peak was detected, indicating the development of a small amount of crystallinity. The wide breadth of the endotherm suggests there is high degree of distortion and/or size distribution in these ordered regions. Wide angle X-ray diffraction pattern of this sample does not show distinct sharp crystalline peaks most likely due to high distortions in the crystalline domains.

Crystallization experiment: A solution cast poly(CBD-adipate) film containing ~3 wt. % dioxane was sealed in an aluminum pan, heated to 170° C., held for 40 minutes, cooled to 0° C. and heated back up to 300° C. The heating and cooling rates for this experiment was 10° C./minute. Scans were run under nitrogen atmosphere.

Incorporation of cannabinoids into polymer structures offers new methods to increase the safety of products containing cannabinoids. The poly(cannabinoid)s discussed herein show a nearly doubled degradation temperature and offer excellent resistance to prolonged heat exposure. Compared to phytocannabinoids, poly(cannabinoid)s could be produced, shipped, and stored at room temperature or above for extended periods without significant degradation or conversion to other cannabinoids. The broad melting peak observed in poly(CBD-adipate) film samples suggest the large scale production of polymer prepared by melt processing to be viable.

The entire contents of all patents, published patent applications and other references cited herein are hereby expressly incorporated herein in their entireties by reference.

Those skilled in the art will recognize, or be able to ascertain using no more than routine experimentation, many equivalents to the specific embodiments and methods described herein. Such equivalents are intended to be encompassed by the scope of the following claims.

It is understood that the detailed examples and embodiments described herein are given by way of example for illustrative purposes only, and are in no way considered to be limiting to the disclosure. Various modifications or changes in light thereof will be suggested to persons skilled in the art and are included within the spirit and purview of this application and are considered within the scope of the appended claims. For example, the relative quantities of the ingredients may be varied to optimize the desired products, additional ingredients may be added, and/or similar ingredients may be substituted for one or more of the ingredients described.

Additional advantageous features and functionalities associated with the systems, methods, and processes of the present disclosure will be apparent from the appended claims. Moreover, those skilled in the art will recognize, or be able to ascertain using no more than routine experimentation, many equivalents to the specific embodiments of the disclosure described herein. Such equivalents are intended to be encompassed by the following claims.

The invention claimed is:

1. A polymer having the formula:

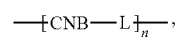

wherein:
CNB is a CNB cannabinoid unit;
L is an adipic acid linker; and
n represents the number of repeat units, wherein n is at least 2, and
wherein the polymer further comprises one or more endcapping groups,
wherein the one or more endcapping groups are selected from a cannabinoid unit having one hydroxyl group, an acid group, or an ester group before reaction with the polymer.

2. The polymer according to claim 1, wherein each CNB cannabinoid unit is independently derived from: CBG, CBD, CBND, dihydro-DHCBD, CBG-V, CBD-V, CBND-V, or dihydro-DHCBD-V, and
wherein each CNB cannabinoid unit is bound to the adipic acid linker via hydroxyl groups, acid groups, or ester groups on the CNB cannabinoid unit before polymerization.

3. The polymer according to claim 2, wherein each CNB cannabinoid unit has one of the following structures before polymerization:

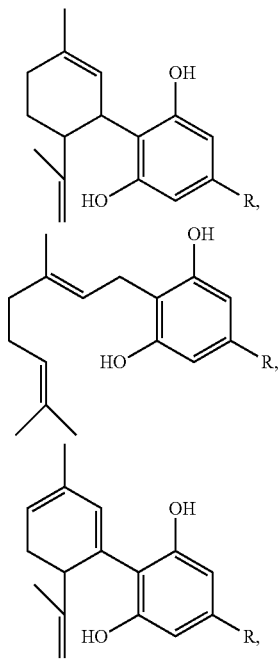

-continued

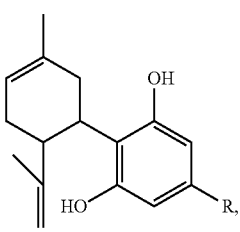

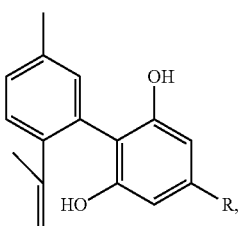

and wherein the R group is: $C_1$-$C_{10}$ alkyl optionally substituted with one or more heteroatoms, a heterocycloalkyl group, or a heteroaryl group; specifically methyl, ethyl, propyl, butyl, pentyl, hexyl, 4'-(3-carboxypropyl)-, 4'-(4-hydroxybutyl), 1,1-dimethylheptyl, 4'-[2-(1H-1,2,3-triazol-yl)ethyl]-, 4'-(2-morpholinoethyl)-, or 4'-(2-ethoxyethyl)-.

4. The polymer according to claim 1, wherein the one or more endcapping groups have the following structure before reaction with the polymer:

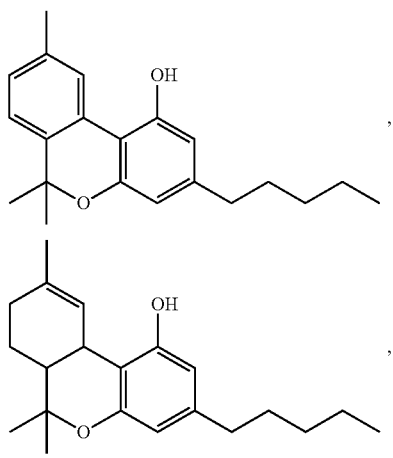

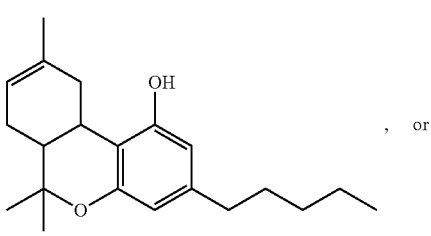

, or

-continued

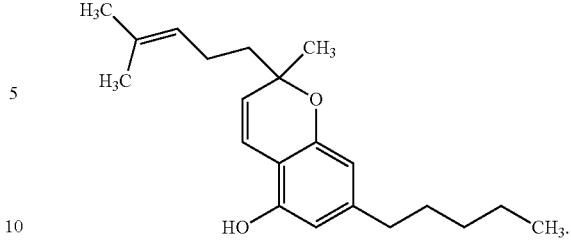

5. The polymer according to claim 1, wherein the average molecular weight is about 1,000 daltons to about 60,000 daltons.

6. The polymer according to claim 1, wherein the average molecular weight is about 15,000 daltons to about 50,000 daltons.

7. A pharmaceutical composition comprising a polymer as described in claim 1 and a pharmaceutically acceptable carrier.

8. The polymer according to claim 1, wherein the polymer comprises a temperature for onset of thermal degradation of greater than 300 degrees Celsius when measured by non-isothermal TGA.

9. The polymer of claim 1, wherein the polymer is a linear polymer.

10. The polymer of claim 1, wherein the polymer is a branched polymer.

11. The polymer of claim 1, wherein polymer comprises poly(CBD-adipate).

12. The polymer of claim 1, wherein polymer comprises poly(CBG-adipate).

13. The polymer of claim 1, wherein the plurality of CNB cannabinoid unit comprises structurally identical cannabinoid units.

14. The polymer of claim 1, wherein the plurality of CNB cannabinoid unit comprises structurally different cannabinoid units.

15. A polymer that comprises a plurality of cannabinoid units wherein the polymer has the formula:

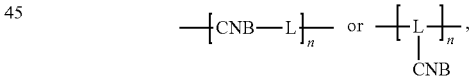

wherein:
CNB is a CNB cannabinoid unit,
L is a linking group; and
n represents the number of repeat units wherein n is at least 2;
wherein the linking group comprises a di- or tri-carboxylic acid linking group comprising citric acid, fumaric acid, glutamic acid, maleic acid, malic acid, malonic acid, oxalic acid, succinic acid, glutaric acid, terephthalic acid, isophthalic acid, oxaloacetic acid, phthalic acid, adipic acid, or butanedioic acid, and wherein the polymer further comprises one or more endcapping groups, wherein the one or more endcapping groups are selected from a cannabinoid unit having one hydroxyl group, an acid group, or an ester group before reaction with the polymer.

16. The polymer according to claim 15, wherein each CNB cannabinoid unit is independently derived from: CBG, CBD, CBC, CBND, dihydro-DHCBD, CBG-V, CBD-V, CBC-V, CBND-V, or dihydro-DHCBD-V, and wherein each CNB cannabinoid unit is bound to the linking group via hydroxyl groups, acid groups, or ester groups on the CNB cannabinoid unit before polymerization.

17. The polymer according to claim 15, wherein each CNB cannabinoid unit has one of the following structures before polymerization:

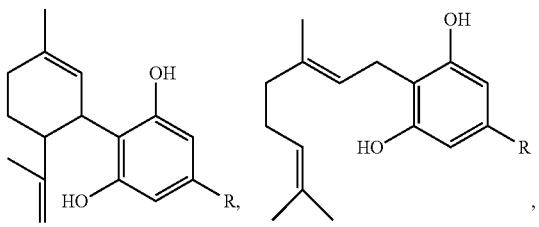

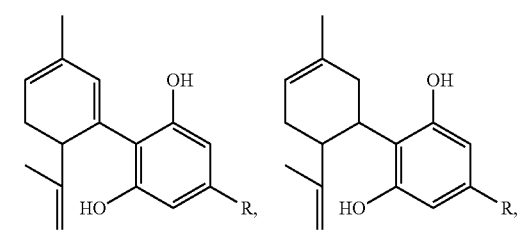

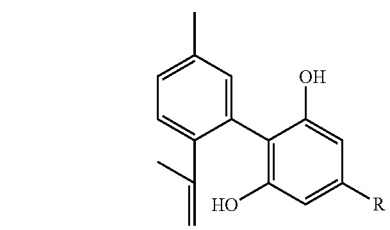

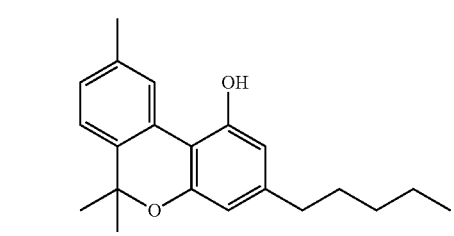

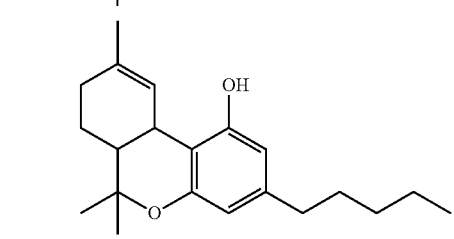

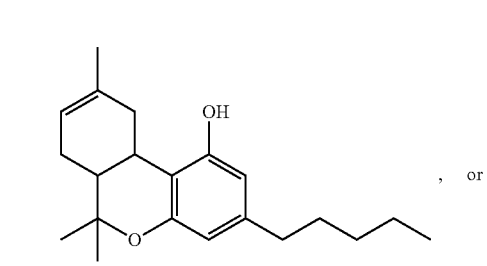, or

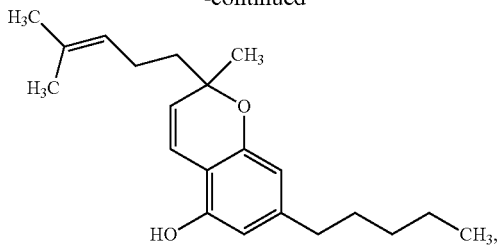

and wherein the R group is: $C_1$-$C_{10}$ alkyl optionally substituted with one or more heteroatoms, a heterocycloalkyl group, or a heteroaryl group; specifically methyl, ethyl, propyl, butyl, pentyl, hexyl, 4'-(3-carboxypropyl)-, 4'-(4-hydroxybutyl), 1,1-dimethylheptyl, 4'-[2-(1H-1,2,3-triazol-yl)ethyl]-, 4'-(2-morpholinoethyl)-, or 4'-(2-ethoxyethyl)-.

18. The polymer according to claim 15, wherein the one or more endcapping groups have the following structure before reaction with the polymer:

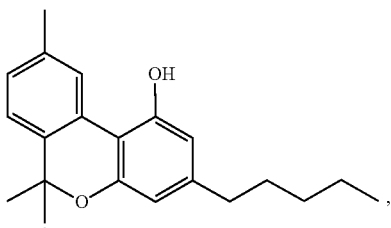

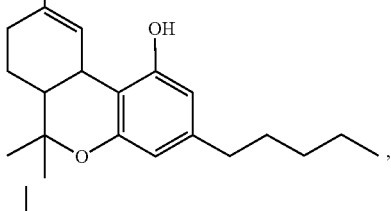

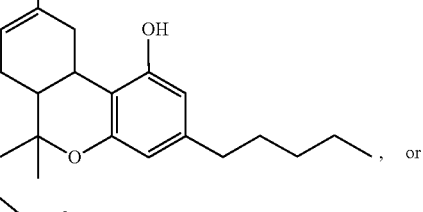

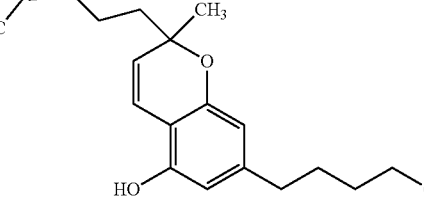, or

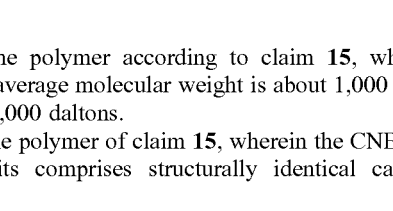

19. The polymer according to claim 15, wherein the number average molecular weight is about 1,000 daltons to about 60,000 daltons.

20. The polymer of claim 15, wherein the CNB cannabinoid units comprises structurally identical cannabinoid units.

21. The polymer of claim 15, wherein the CNB cannabinoid units comprises structurally different cannabinoid units.

22. A pharmaceutical composition comprising the polymer according to claim 15 and a pharmaceutically acceptable carrier.

23. A cosmetic composition comprising the polymer according to claim 15 and a cosmetically acceptable carrier.

24. An article comprising the polymer according to claim 15, wherein the article is a microsphere, a film, a fiber, a fiber matrix, a nonwoven fabric, a woven fabric, a wound dressing, a medical device, a stent, a catheter, a catheter coating, or a transdermal patch.

25. A cosmetic composition comprising the polymer according to claim 1 and a cosmetically acceptable carrier.

26. An article comprising the polymer according to claim 1, wherein the article is a microsphere, a film, a fiber, a fiber matrix, a nonwoven fabric, a woven fabric, a wound dressing, a medical device, a stent, a catheter, a catheter coating, or a transdermal patch.

* * * * *